United States Patent
Hu et al.

(10) Patent No.: US 11,941,338 B2
(45) Date of Patent: Mar. 26, 2024

(54) INTEGRATED CIRCUIT WITH DUMMY BOUNDARY CELLS

(71) Applicant: Taiwan Semiconductor Manufacturing Company, Ltd., Hsinchu (TW)

(72) Inventors: Wei-Yi Hu, Zhubei (TW); Chih-Ming Chao, Hsinchu (TW); Chi-Yeh Yu, Hsinchu (TW)

(73) Assignee: Taiwan Semiconductor Manufacturing Company, Ltd., Hsinchu (TW)

( * ) Notice: Subject to any disclaimer, the term of this patent is extended or adjusted under 35 U.S.C. 154(b) by 64 days.

(21) Appl. No.: 17/873,699

(22) Filed: Jul. 26, 2022

(65) Prior Publication Data

US 2022/0358276 A1  Nov. 10, 2022

Related U.S. Application Data

(62) Division of application No. 16/885,657, filed on May 28, 2020, now Pat. No. 11,443,094.

(60) Provisional application No. 62/883,743, filed on Aug. 7, 2019.

(51) Int. Cl.
| | |
|---|---|
| *G06F 30/392* | (2020.01) |
| *G06F 30/398* | (2020.01) |
| *H01L 27/02* | (2006.01) |
| *H01L 29/423* | (2006.01) |
| *G06F 115/08* | (2020.01) |

(52) U.S. Cl.
CPC .......... *G06F 30/392* (2020.01); *G06F 30/398* (2020.01); *H01L 27/0207* (2013.01); *H01L 29/42376* (2013.01); *G06F 2115/08* (2020.01)

(58) Field of Classification Search
CPC ... G06F 30/392; G06F 30/398; H01L 27/0207
See application file for complete search history.

(56) References Cited

U.S. PATENT DOCUMENTS

| | | | |
|---|---|---|---|
| 2004/0006754 A1* | 1/2004 | Sonohara | G06F 30/39 257/E27.009 |
| 2004/0133868 A1* | 7/2004 | Ichimiya | G06F 30/392 716/120 |
| 2006/0289750 A1* | 12/2006 | Yamaguchi | G03F 1/68 250/307 |

(Continued)

*Primary Examiner* — Nelson Garces
(74) *Attorney, Agent, or Firm* — Birch, Stewart, Kolasch & Birch, LLP

(57) ABSTRACT

Integrated circuits (IC) are provided. An IC includes a plurality of macros and a top channel. Each macro includes a macro boundary and a main pattern surrounded by the macro boundary. The top channel includes a plurality of first and second sub-channels. Each first sub-channel is arranged between a first macro and a second macro, and is formed by a plurality of first dummy boundary cells. Each second sub-channel is arranged between two of the second macros, and is formed by a plurality of second dummy boundary cells. The macro boundaries of the first macros are formed by the first dummy boundary cells, and the macro boundaries of the second macros are formed by the second dummy boundary cells. A first gate length of dummy patterns within the first dummy boundary cells is greater than a second gate length of dummy patterns within the second dummy boundary cells.

20 Claims, 16 Drawing Sheets

(56) References Cited

U.S. PATENT DOCUMENTS

2010/0131913 A1\* 5/2010 Zou ...................... G06F 30/392
716/118
2014/0042585 A1 2/2014 Peng et al.

\* cited by examiner

INTEGRATED CIRCUIT WITH DUMMY BOUNDARY CELLS

CROSS REFERENCE TO RELATED APPLICATIONS

This application is a Divisional of application Ser. No. 16/885,657, filed on May 28, 2020, which claims priority of U.S. Provisional Application No. 62/883,743, filed on Aug. 7, 2019, the entirety of which is incorporated by reference herein.

BACKGROUND

In general, circuit designers pursue a circuit design that minimizes device degradation during manufacturing of a semiconductor wafer. One way to minimize device degradation is through the use of dummy cells. A dummy cell may include one or more physical layers, and those layers are floating (i.e., no electrical connection). Specifically, the dummy cells can be used as boundary cells for macros/IPs, so as to minimize the potential for defects during manufacturing.

BRIEF DESCRIPTION OF THE DRAWINGS

Aspects of the present disclosure are best understood from the following detailed description when read with the accompanying figures. It should be noted that, in accordance with the standard practice in the industry, various nodes are not drawn to scale. In fact, the dimensions of the various nodes may be arbitrarily increased or reduced for clarity of discussion.

DETAILED DESCRIPTION

Figure 1:
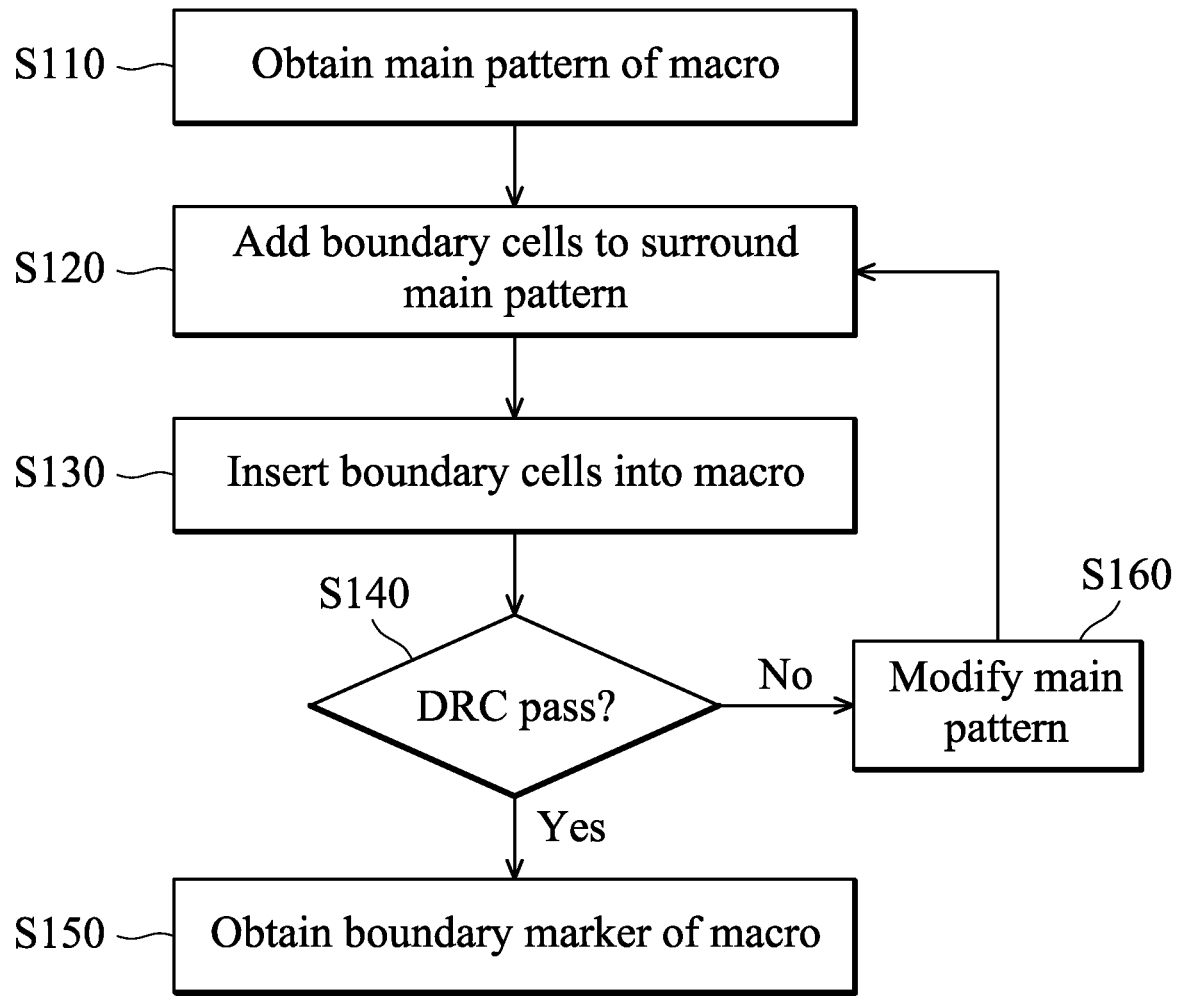
FIG. 1 illustrates a method for inserting dummy boundary cells in a macro (or an intellectual property (IP)) of an IC, in accordance with some embodiments of the disclosure.

The following disclosure provides many different embodiments, or examples, for implementing different nodes of the subject matter provided. Specific examples of components and arrangements are described below to simplify the present disclosure. These are, of course, merely examples and are not intended to be limiting. In some embodiments, the formation of a first node over or on a second node in the description that follows may include embodiments in which the first and the second nodes are formed in direct contact, and may also include embodiments in which additional nodes may be formed between the first and the second nodes, such that the first and the second nodes may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Some variations of the embodiments are described. Throughout the various views and illustrative embodiments, like reference numbers are used to designate like elements. It should be understood that additional operations can be provided before, during, and/or after a disclosed method, and some of the operations described can be replaced or eliminated for other embodiments of the method.

Furthermore, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

In integrated circuit (IC) design, a variety of functions are integrated into one chip, and an application specific integrated circuit (ASIC) or system on a chip (SOC) cell based design is often used. In this approach, a library of known functions is provided, and after the functional design of the device is specified by choosing and connecting these standard functions, and proper operation of the resulting circuit is verified using electronic design automation (EDA) tools, the library elements are mapped on to predefined layout cells, which contain prefigured elements such as transistors. The cells are chosen with the particular semiconductor process nodes and parameters in mind and create a process-parameterized physical representation of the design. The design flow continues from that point by performing placement and routing of the local and global connections needed to form a layout of the completed design using the standard cells.

After the layout is completed, various analysis procedure are performed and the layout is verified to check whether the layout violates any of the various constraints or rules. For example, design rule check (DRC), layout versus schematic (LVS) and electric rule check (ERC) are performed. The DRC is a process of checking whether the layout is successfully completed with a physical measure space according to the design rule, and the LVS is a process of checking whether the layout meets a corresponding circuit diagram. In addition, the ERC is a process of for checking whether devices and wires/nets are electrically well connected therebetween. After design rule checks, design rule verification, timing analysis, critical path analysis, static and dynamic power analysis, and final modifications to the design, a tape out process is performed to produce photomask generation data. This photomask generation (PG) data is then used to create the optical masks used to fabricate the semiconductor device in a photolithographic process at a wafer fabrication facility (FAB). In the tape out process, the database file of the IC is used to make various layers of masks for integrated circuit manufacturing. In some embodiments, the database file is a Graphic Database System (GDS) file (e.g., a GDS file or a GDSII file). Furthermore, the GDS file is the industry's standard format for transfer of IC layout data between design tools of different vendors.

FIG. 1 illustrates a method for inserting boundary cells in a macro (or an intellectual property (IP)) of an IC, in accordance with some embodiments of the disclosure. The method of FIG. 1 may include other operations not illustrated here, and the various illustrated operations of method may be performed in a different order than shown. The method of FIG. 1 may be performed by one or more processing devices within a computing device capable of performing EDA tools. Furthermore, the method of FIG. 1 is capable of performing on each macro of the IC.

In operation S110, a main pattern of the macro is obtained, and the macro is a circuit or a function within the IC. In some embodiments, the main pattern includes a layout that includes a representation of the components and interconnects (e.g., metal lines and vias) that make up the macro. In other words, the layout includes the geometrical configuration of the components to be fabricated onto a substrate of the IC. Furthermore, the components may include transistors, diodes, resistors, capacitors, and inductors. In some embodiments, the main pattern has an outline that defines the outer edge or shape of the layout of the main pattern. In some embodiments, the main pattern is a block box.

In operation S120, a plurality of dummy boundary cells form a macro boundary to surround the main pattern. The dummy boundary cells are the dummy cells for protecting the main pattern. In some embodiments, the dummy boundary cells have the same configuration and same size, i.e., the dummy boundary cells are the same type of boundary cell. In some embodiments, the dummy boundary cell includes one or more physical layers, such as poly (PO), Oxide (OD), and so on. Furthermore, the physical layers form a plurality dummy patterns.

In some embodiments, the dummy patterns includes a plurality of transistors without electrical connection. The gate length of P-type (or N-type) transistors within the macro boundary is equal to the gate length of P-type (or N-type) transistors within the main pattern. In some embodiments, the gate length of P-type (or N-type) transistors within the macro boundary is different from the gate length of P-type (or N-type) transistors within the main pattern. Furthermore, one type of the dummy boundary cells of the macro boundary is selected from two or more types of the dummy boundary cells according to the gate length of transistors within the main pattern.

In operation S130, a plurality of dummy boundary cells are inserted into one or more gaps between the macro boundary and the main pattern. In some embodiments, the dummy boundary cells of the macro boundary and the inserted dummy boundary cells are the same type of boundary cells, i.e., the dummy boundary cells of the macro have the same configuration and same size. In some embodiments, the dummy boundary cells of the macro boundary and the inserted dummy boundary cells are different types of boundary cells. For example, the dummy boundary cells of the macro boundary and the inserted dummy boundary cells are the same size and have different configurations.

In operation S140, an analysis procedure (e.g., DRC) is performed and the macro is verified to check whether the macro violates any of the various constraints or rules. If a violation is present, the main pattern (e.g., area or shape) of the macro must be modified (operation S160), and the method is performed again from step S120 based on the modified main pattern until no violations are present. Conversely, if there are no violations in the macro, the layout information and a boundary marker of the macro are obtained (operation S150). In some embodiments, the layout information includes library exchange formation (LEF) data and design exchange formation (DEF) data. The LEF data represents all required information for a place and route of the components. The DEF data represents information regarding netlists, component placements and routing. Furthermore, the boundary marker represents the outline of the macro and the type of the dummy boundary cell.

Figure 2:
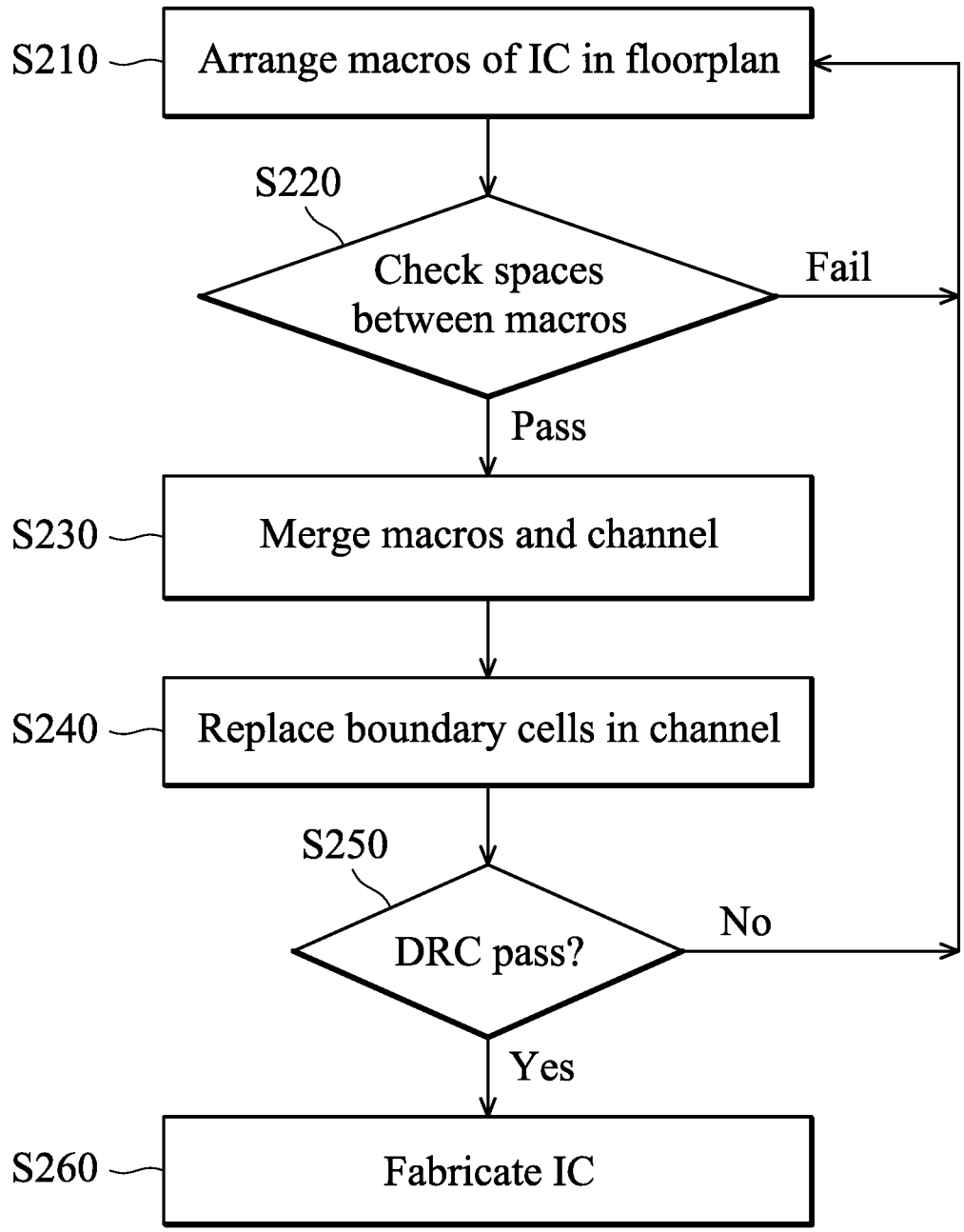
FIG. 2 illustrates a method for inserting dummy boundary cells in an IC, in accordance with some embodiments of the disclosure.

FIG. 2 illustrates a method for inserting dummy boundary cells in an IC, in accordance with some embodiments of the disclosure. The method of FIG. 2 may include other operations not illustrated here, and the various illustrated operations of method may be performed in a different order than shown. The method of FIG. 2 may be performed by one or more processing devices within a computing device capable of performing EDA tools. Moreover, the method of FIG. 2 is performed after the method of FIG. 1 is performed on the macros of the IC.

In operation S210, the macros of the IC with the boundary markers are placed in the floorplan of the IC, and the boundary markers are obtained in operation S150 of FIG. 1. In some embodiments, the macro is a black box with the boundary marker, and the black box is a block box without layout information. In some embodiments, the macros are placed in the floorplan separately. In some embodiments, some macros are in contact with the other macros in the floorplan.

In operation S220, each space between two adjacent and untouched macros is checked, so as to ensure that the space between the two adjacent and untouched macros is sufficient to place the dummy boundary cells. In some embodiments, the space is obtained from the boundary marker of one macro to the boundary marker of another macro. If the space is not enough to place the dummy boundary cells (i.e., check fail), the macros are re-arranged in the floorplan of the IC (operation S210). Conversely, if each space is big enough to place the dummy boundary cells (i.e., check pass), the GDS file of each macro is obtained in operation S230. As described above, the data of the layout is commonly provided as a GDS file, and the layout includes the geometrical configuration of the components to be fabricated onto a substrate of the IC.

In operation S230, the macros and a channel between the macros are merged in GDS format, and the channel is formed by the spaces of the macros. Furthermore, a plurality of default boundary cells are filled in the channel. The default boundary cell is one type of boundary cells. Furthermore, the macro boundaries of some macros are formed by the default boundary cells.

In operation S240, the default dummy boundary cells within the channel and between two adjacent macros with the macro boundaries formed by the dummy boundary cells other than the default dummy boundary cells, are replaced with the other type of dummy boundary cells. All types of dummy boundary cells are the same size in the layout. In some embodiments, the width and height of all types of dummy boundary cells are as small as possible, so as to have better macro dimension flexibility. In some embodiments, some default dummy boundary cells within the channel and close to the macro with the macro boundary formed by the dummy boundary cells other than the default dummy boundary cells, are replaced with the other type of dummy boundary cells.

In operation S250, an analysis procedure (e.g., DRC) is performed and the macros and the channel are verified to check whether the macros and the channel violate any of the various constraints or rules. If a violation is present, the macros are re-arranged in the floorplan of the IC and the floorplan is modified (operation S210), and the method is performed again from step S210 based on the modified floorplan until no violations are present. Conversely, if there are no violations in the macros and the channel, the IC is fabricated based on the floorplan and the corresponding layout (operation S260).

Figure 3:
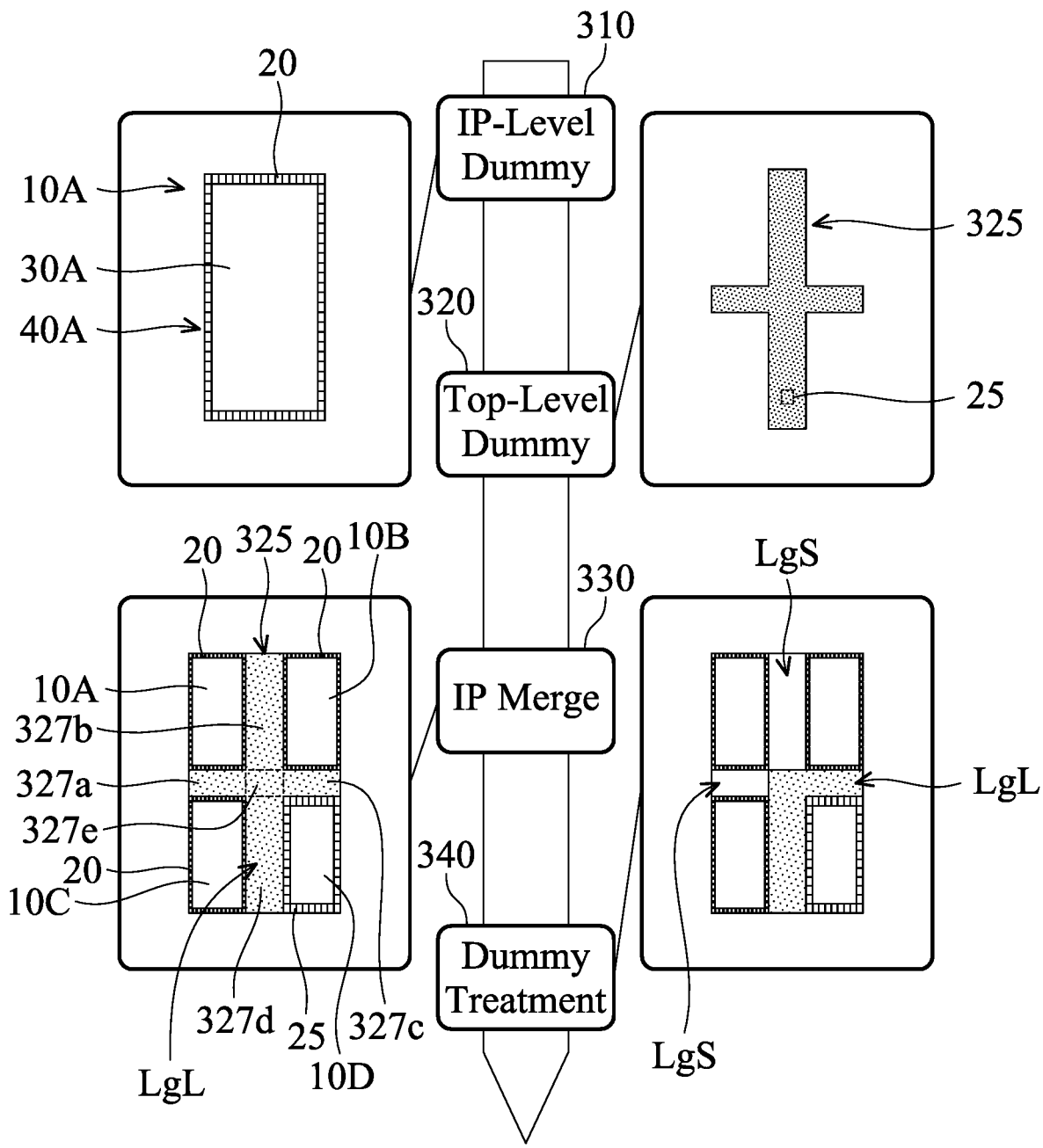
FIG. 3 illustrates hierarchical stages of the IC according to the method of FIG. 2, in accordance with some embodiments of the disclosure.

FIG. 3 illustrates hierarchical stages of the IC according to the method of FIG. 2, in accordance with some embodiments of the disclosure. The different stages represent the dummy boundary cells being inserted hierarchically. In IP-level dummy stage 310, each macro is protected by the corresponding dummy boundary cells. For example, a macro 10A includes a main pattern 30A and a macro boundary 40A formed by a plurality of dummy boundary cells 20, and the main pattern 30A is surrounded by the dummy boundary cells 20.

In some embodiments, the main pattern 30A of the macro 10A includes a plurality of transistors with a first gate length Lg1. Furthermore, the dummy boundary cells 20 of the macro boundary 40A are a first type of dummy boundary cells LgS. In the first type of dummy boundary cell LgS, dummy poly gate patterns have poly gate with the first gate length Lg1. In some embodiments, the main pattern 30A of the macro 10A includes a plurality of transistors with the first gate length Lg1. Furthermore, the dummy boundary cells 20 of the macro boundary 40A are a second type of dummy boundary cells LgL. In the second type of dummy boundary cell LgL, dummy poly gate patterns have poly gate with the second gate length Lg2, and the second gate length Lg2 is greater than the first gate length Lg1 (Lg2>Lg1). Specifically, the dummy boundary cells 20 of the macro 10A are the boundary cells with the gate length equal to the gate length of the transistor within the main pattern 30A of the macro 10A.

In some embodiments, the main pattern 30A of the macro 10A includes a plurality of transistors with the second gate length Lg2. Furthermore, the dummy boundary cells 20 of the macro 10A may be the first type of dummy boundary cells LgS or a second type of dummy boundary cells LgL. In other words, the dummy boundary cells 20 of the macro 10A are the boundary cells with the gate length equal to or less than the gate length of the transistor within the main pattern 30A of the macro 10A. In top-level dummy stage 320, a top channel 325 is filled with a plurality of default dummy boundary cells 25, and the default dummy boundary cells 25 are the second type of boundary cells LgL. In some embodiments, the default dummy boundary cells 25 are the boundary cells with the maximum gate length. In some embodiments, the default dummy boundary cells 25 are the boundary cells with the specific gate length. Furthermore, dummy boundary cells 20 and 25 have different patterns for different gate length dummy requirements.

In IP merge stage 330, the macros 10A through 10D and the top channel 325 are merged in GDS format. In such embodiments, the macros 10A through 10C are surrounded by the dummy boundary cells 20, and the macro 10D is surrounded by the dummy boundary cells 25. As described above, the dummy boundary cells 20 are the first type of boundary cells LgS, and the dummy boundary cells 25 are the second type of boundary cells LgL. The top channel 325 has a cross shape. The top channel 325 is divided into the sub-channels 327a through 327e, and the sub-channels 327a through 327e are filled with dummy boundary cells 25 (i.e., the default boundary cells). The sub-channel 327a is disposed between the macros 10A and 10C, and is in contact with the macros 10A and 10C. The sub-channel 327b is disposed between the macros 10A and 10B, and is in contact with the macros 10A and 10B. The sub-channel 327c is disposed between the macros 10B and 10D, and is in contact with the macros 10B and 10D. The sub-channel 327d is disposed between the macros 10c and 10D, and is in contact with the macros 10C and 10D. The sub-channel 327e is disposed between the macros 10a through 10D. Furthermore, some dummy boundary cells 25 within the top channel 325 will be replaced with other type of dummy boundary cells (e.g., the dummy boundary cells 20) in next hierarchy stage.

In dummy treatment stage 340, the dummy boundary cells 25 between the macros surrounded by the dummy boundary cells 20 are replaced with the dummy boundary cells 20. For example, the sub-channel 327a is disposed between the macros 10A and 10C, and the macro boundaries of the macros 10A and 10C are formed by the dummy boundary cells 20. Thus, the dummy boundary cells 25 of the sub-channel 327a are replaced with the dummy boundary cells 20. Similarly, the sub-channel 327b is disposed between the macros 10A and 10B, and the macro boundaries of the macros 10A and 10B are formed by the dummy boundary cells 20. Thus, the dummy boundary cells 25 of the sub-channel 327b are replaced with the dummy boundary cells 20. However, the dummy boundary cells 25 of the sub-channel 327c through 327e are not replaced since the sub-channel 327c through 327e are in contact with the macro 10D surrounded by the macro boundary formed by the dummy boundary cells 25.

Figure 4A:
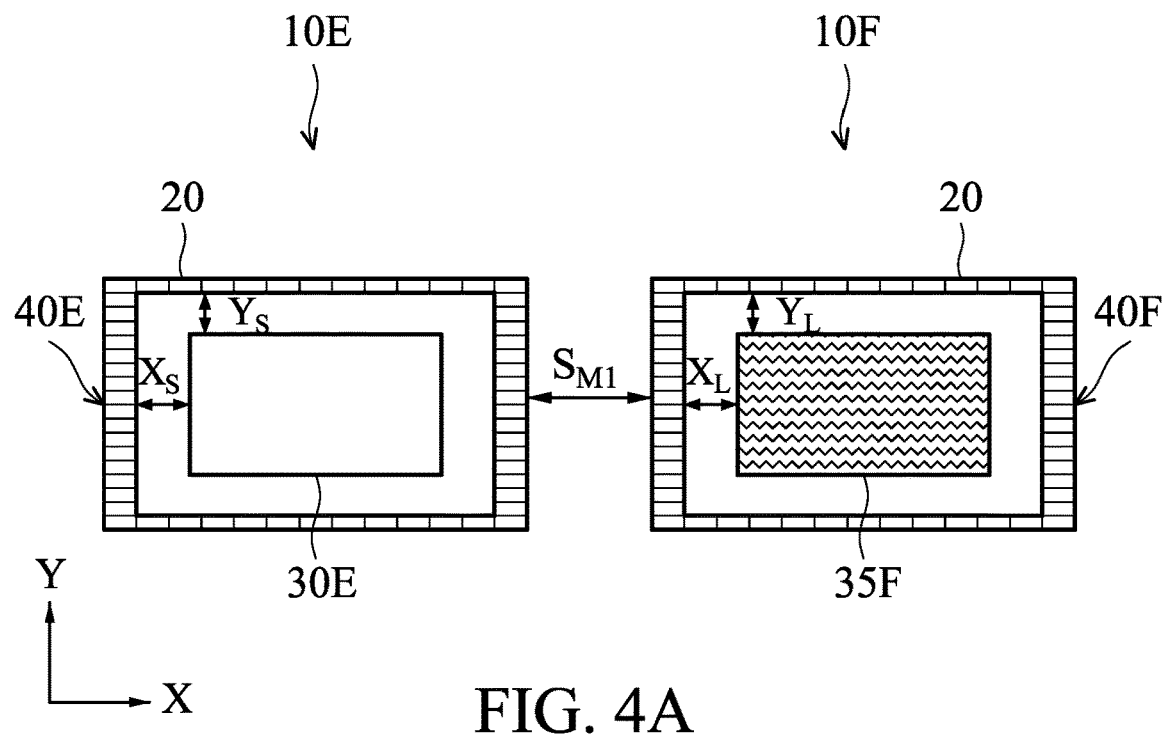
FIG. 4A illustrates a space between two adjacent macros, in accordance with some embodiments of the disclosure.

FIG. 4A illustrates a space $S_{M1}$ between two adjacent macros 10E and 10F, in accordance with some embodiments of the disclosure. The macro 10E includes a main pattern 30E and a macro boundary 40E, and the macro boundary 40E is formed by the dummy boundary cells 20. The main pattern 30E includes the transistors with the first gate length Lg1, and the dummy boundary cells 20 are the first type of boundary cells LgS with the first gate length Lg1. A distance (or a gap) between the main pattern 30E and the macro boundary 40E along a X direction is $X_S$, and a distance (or a gap) between the main pattern 30E and the macro boundary 40E along a Y direction is $Y_S$.

In FIG. 4A, the macro 10F includes a main pattern 35F and a macro boundary 40F, and the macro boundary 40F is formed by the dummy boundary cells 20. The main pattern 35F includes the transistors with the second gate length Lg2, and the dummy boundary cells 20 are the first type of boundary cells LgS with the first gate length Lg1. A distance (or a gap) between the main pattern 35F and the macro boundary 40F along a X-direction is $X_L$, and $X_L$ is greater than $X_S$ (i.e., $X_L > X_S$). Furthermore, a distance (or a gap) between the main pattern 35F and the macro boundary 40F along a Y-direction is $Y_L$, and $Y_L$ is greater than $Y_S$ (i.e., $Y_L > Y_S$).

Figure 4B:
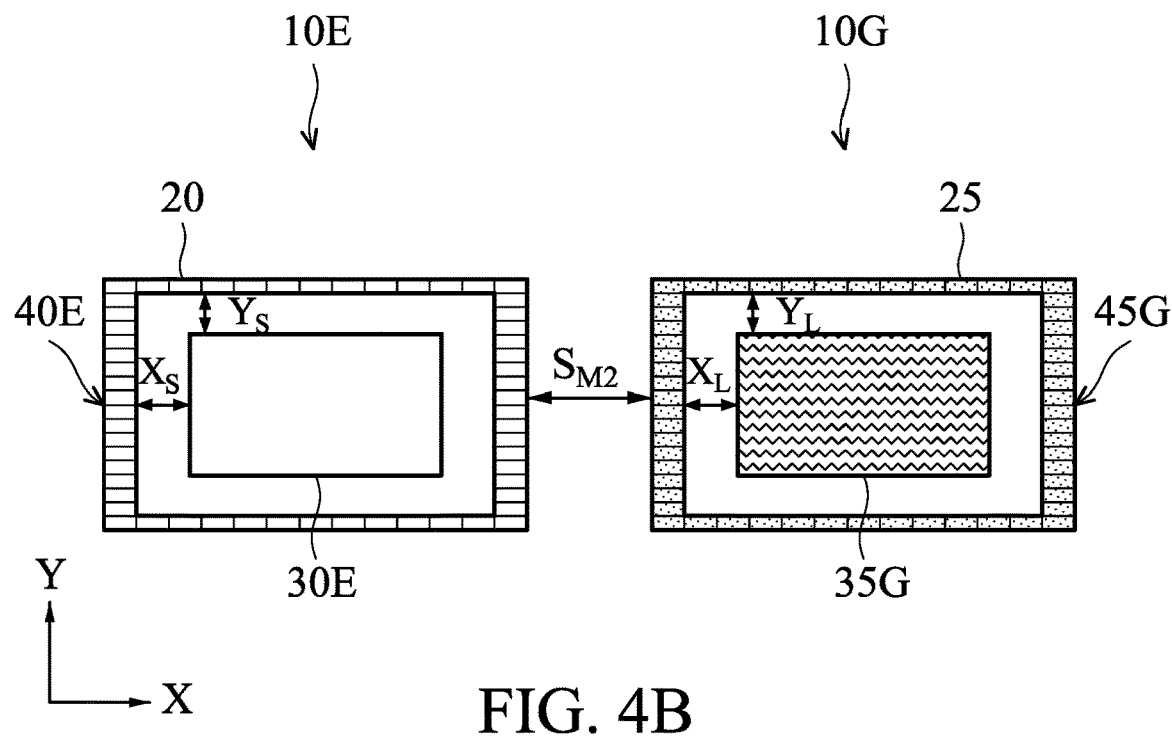
FIG. 4B illustrates a space between two adjacent macros 10E and 10G, in accordance with some embodiments of the disclosure.

FIG. 4B illustrates a space $S_{M2}$ between two adjacent macros 10E and 10G, in accordance with some embodiments of the disclosure. The macro 10E includes a main pattern 30E and a macro boundary 40E, and the macro boundary 40E is formed by the dummy boundary cells 20. As described above, the distance between the main pattern 30E and the macro boundary 40E along the X direction is $X_S$, and the distance between the main pattern 30E and the macro boundary 40E along the Y direction is $Y_S$.

In FIG. 4B, the macro 10G includes a main pattern 35G and a macro boundary 45G, and the macro boundary 45G is formed by the dummy boundary cells 25. The main pattern 35G includes the transistors with the second gate length Lg2, and the dummy boundary cells 25 are the second type of boundary cells LgL with the second gate length Lg2. The distance between the main pattern 35G and the macro boundary 45G along the X-direction is $X_L$, and $X_L$ is greater than $X_S$ (i.e., $X_L > X_S$). Furthermore, the distance between the main pattern 35G and the macro boundary 45G along the Y-direction is $Y_L$, and $Y_L$ is greater than $Y_S$ (i.e., $Y_L > Y_S$).

The distances $X_L$ and $Y_L$ of the macro 10F in FIG. 4A and the macro 10G in FIG. 4B are determined according to the processes of the IC. Similarly, the distances $X_S$ and $Y_S$ of the macro 10E in FIGS. 4A and 4B are also determined according to the processes of the IC. Compared with FIG. 4A, the space $S_{M2}$ of FIG. 4B is greater than the space $S_{M1}$ of FIG. 4A (i.e., $S_{M2} > S_{M1}$). In other words, a space (e.g., $S_{M1}$) between two adjacent macros with the macro boundaries formed by the same dummy boundary cells (e.g., 20 or 25) is less than a space (e.g., $S_{M2}$) between two adjacent macros with the macro boundaries formed by the different dummy boundary cells (e.g., 20 and 25).

Figure 5A:
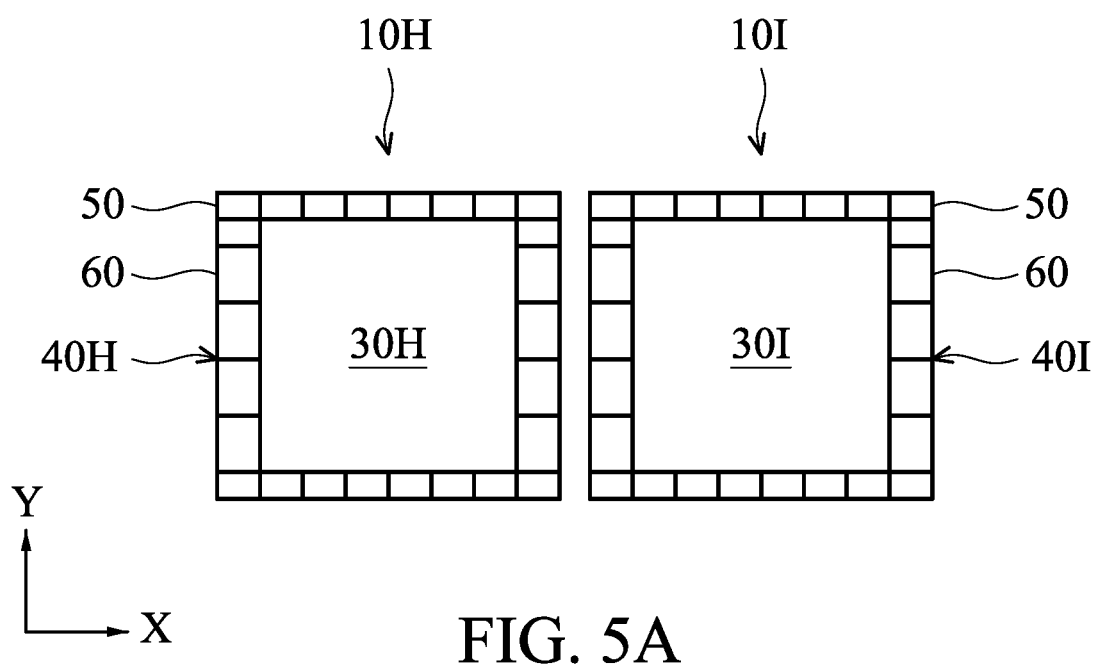
FIGS. 5A and 5B illustrate the placements of the macros 10H and 10I, in accordance with some embodiments of the disclosure.
Figure 5B:
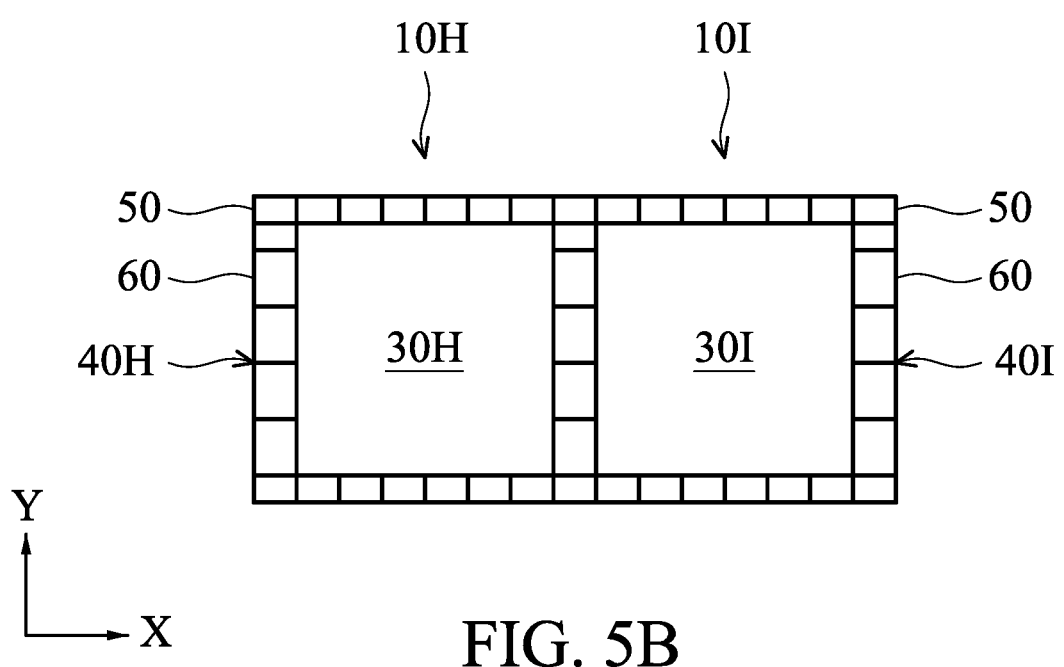

FIGS. 5A and 5B illustrate the placements of the macros 10H and 10I, in accordance with some embodiments of the disclosure. The macro 10H includes a main pattern 30H and a macro boundary 40H, and the macro boundary 40H is formed by the dummy boundary cells 50 and 60. The dummy boundary cells 50 and 60 are the same type of boundary cells with different sizes, and gate lengths of transistors within the dummy boundary cells 50 and 60 are the same. Similarly, the macro 10I includes a main pattern 30I and a macro boundary 40I, and the macro boundary 40I is formed by the dummy boundary cells 50 and 60. The boundary 60 has larger size in Y-direction. The dummy boundary cells 50 are placed in the macros 10H and 10I along X-direction, and each of upper and lower sides of the macros 10H and 10I includes eight boundary cells 50. The dummy boundary cells 60 are placed in the macros 10H and 10I along Y-direction, and each of left and right sides of the macros 10H and 10I includes four dummy boundary cells 60. Furthermore, each of left and right sides of the macros 10H and 10I further includes one dummy boundary cell 50. Therefore, the macros 10H and 10I have the same width and height. In some embodiments, the macro boundary 40H of the macro 10H and the macro boundary 40I of the macro 10I are formed by the boundary cells with the same size, e.g., the dummy boundary cells 20 or 25.

Compared with FIG. 5A that the macro 10H is separated from the macro 10I, the macro 10H overlaps with the macro 10I in FIG. 5B partially. For example, the dummy boundary cells in the right side of the macro 10H overlap with the dummy boundary cells in the left side of the macro 10I, thereby decreasing the layout area of the macros 10H and 10I.

Figure 6A:
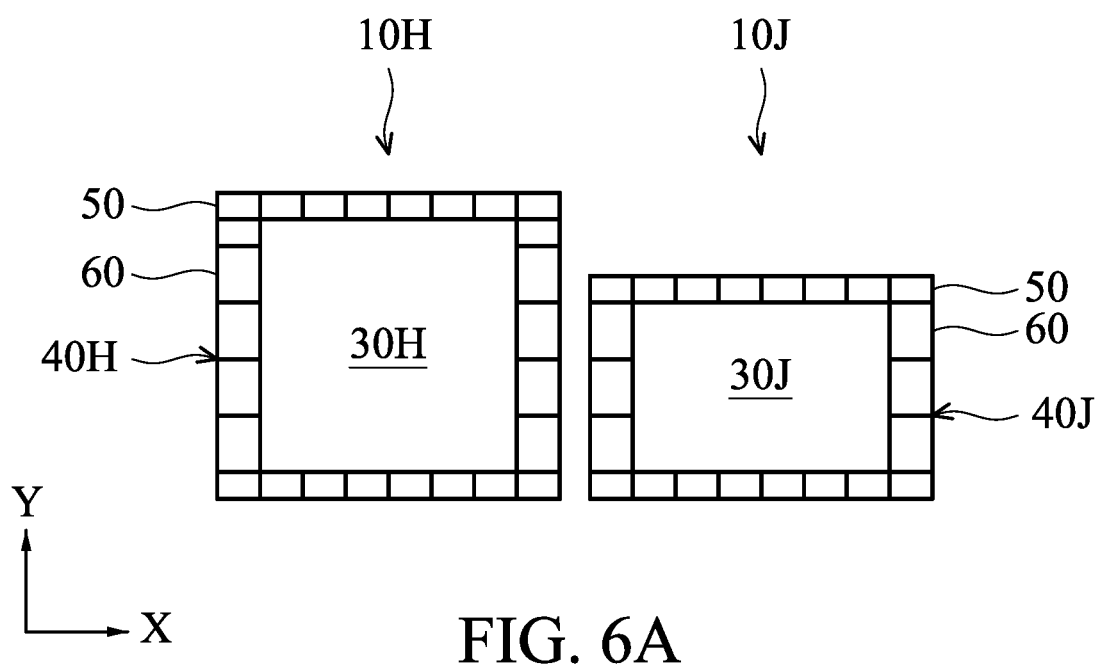
FIGS. 6A through 6C illustrate the placements of the macros 10H and 10J, in accordance with some embodiments of the disclosure.
Figure 6B:
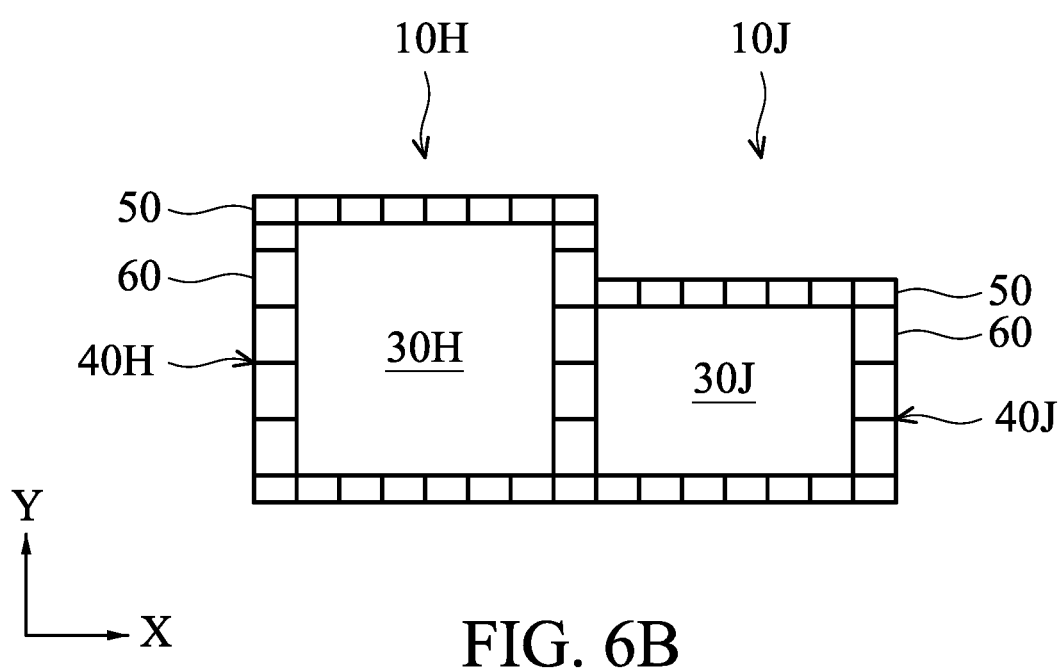
Figure 6C:
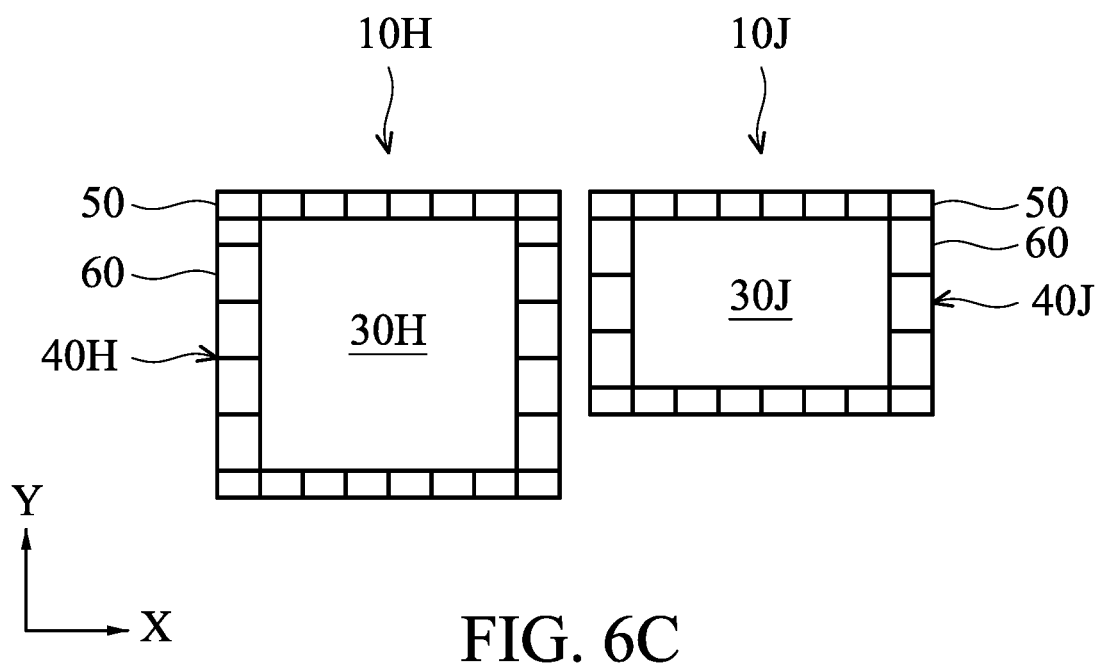

FIGS. 6A through 6C illustrate the placements of the macros 10H and 10J, in accordance with some embodiments of the disclosure. The macro 10H includes the main pattern 30H and the macro boundary 40H, and the macro boundary 40H is formed by the dummy boundary cells 50 and 60. The dummy boundary cells 50 and 60 are the same type of boundary cells with different sizes, and gate lengths of dummy patterns within the dummy boundary cells 50 and 60 are the same. Furthermore, the macro 10J includes a main pattern 30J and a macro boundary 40J, and the macro boundary 40J is formed by the dummy boundary cells 50 and 60. The dummy boundary cells 50 are placed in the macros 10H and 10J along X-direction, and each of upper and lower sides of the macros 10H and 10J includes eight dummy boundary cells 50. The dummy boundary cells 60 are placed in the macros 10H and 10J along Y-direction. each of left and right sides of the macro 10H includes four dummy boundary cells 60 and one dummy boundary cell 50. Furthermore, each of left and right sides of the macro 10J includes three dummy boundary cells 60. Thus, the height of the macro 10H is greater than that of the macro 10J, and the width of the macro 10H is equal to that of the macro 10J. In some embodiments, the macro boundary 40H of the macro 10H and the macro boundary 40I of the macro 10I are formed by the dummy boundary cells with the same size, e.g., the dummy boundary cells 20 or 25.

Compared with FIG. 6A that the macro 10H is separated from the macro 10J, the macro 10H overlaps with the macro 10J in FIG. 6B. In FIG. 6B, the lower side of the macro 10H is aligned to the lower side of the macro 10J, and the dummy boundary cells in the right side of the macro 10H overlap with the dummy boundary cells in the left side of the macro 10J. Furthermore, the dummy boundary cell 50 in the upper left corner of the macro 10J is remove. Thus, compared with FIG. 6A, the layout area of the macros 10H and 10J is decreased in FIG. 6B. The difference between FIG. 6A and FIG. 6C is that the upper side of the macro 10H is aligned to the upper side of the macro 10J. Thus, the dummy boundary cells in the right side of the macro 10H cannot overlap with the dummy boundary cells in the left side of the macro 10J.

Figure 7A:
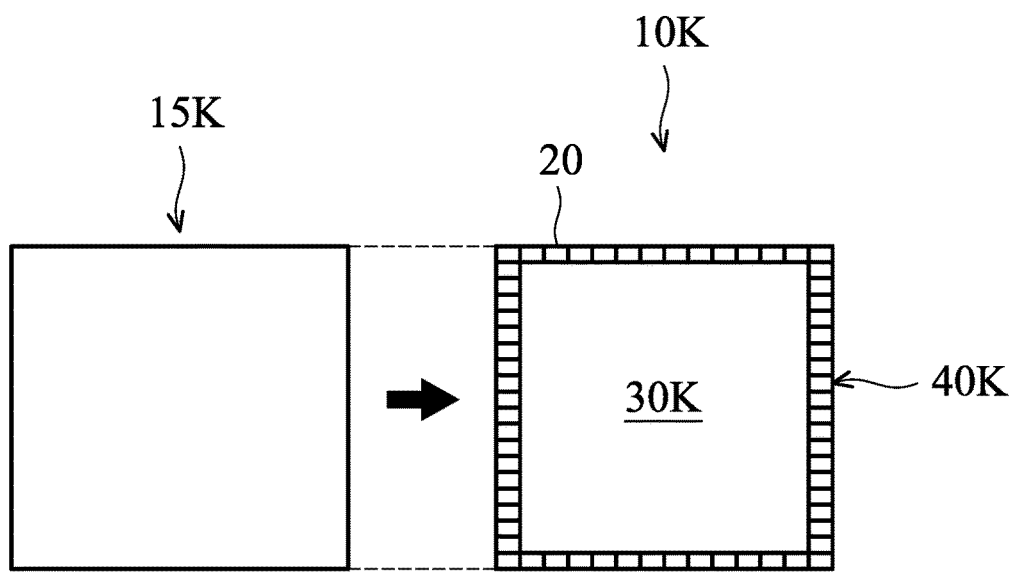
FIG. 7A illustrates a macro boundary inserted by dummy utility in GDS, in accordance with some embodiments of the disclosure.

FIG. 7A illustrates a macro boundary inserted by dummy utility in GDS, in accordance with some embodiments of the disclosure. In FIG. 7A, a macro boundary 40K is formed by a plurality of dummy boundary cells 20, and the macro boundary 40K is arranged within a layout area 15K of a macro 10K. Specifically, the dummy boundary cells 20 are placed inside the layout area 15K and surround the outline of the layout area 15K. In some embodiments, the dummy boundary cells 20 are arranged to surround a main pattern 30K of the macro 10K. Furthermore, size of a black box of the macro 10K is determined according to the layout area 15K.

Figure 7B:
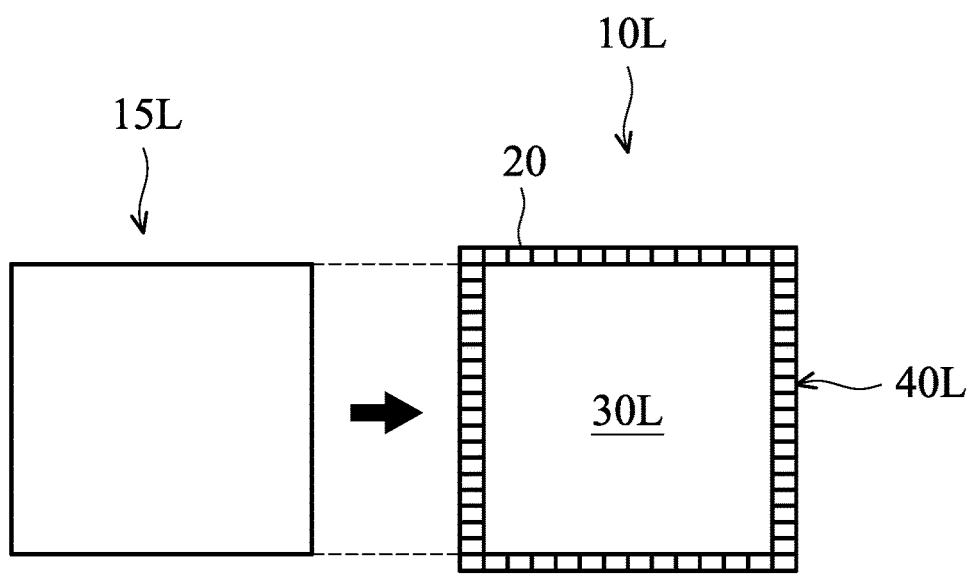
FIG. 7B illustrates a macro boundary inserted by auto place and route (APR) tool, in accordance with some embodiments of the disclosure.

FIG. 7B illustrates a macro boundary inserted by auto place and route (APR) tool, in accordance with some embodiments of the disclosure. In FIG. 7B, a macro boundary 40L is formed by a plurality of dummy boundary cells 20, and the macro boundary 40L is arranged to surround a layout area 15L of a macro 10L. Specifically, the dummy boundary cells 20 are placed outside the layout area 15L and surround the outline of the layout area 15L. Furthermore, size of a black box of the macro 10L is determined according to the layout area 15L, and the dummy boundary cells 20 are arranged to surround the black box of the macro 10L.

Compared with the macro 10L of FIG. 7B, the macro boundary 40K is inside the macro 10K of FIG. 7A, thereby increasing IP protection. Furthermore, by inserting a macro boundary into a macro in GDS, the macro is compatible with the floorplan of the IC in GDS format.

Figure 8:
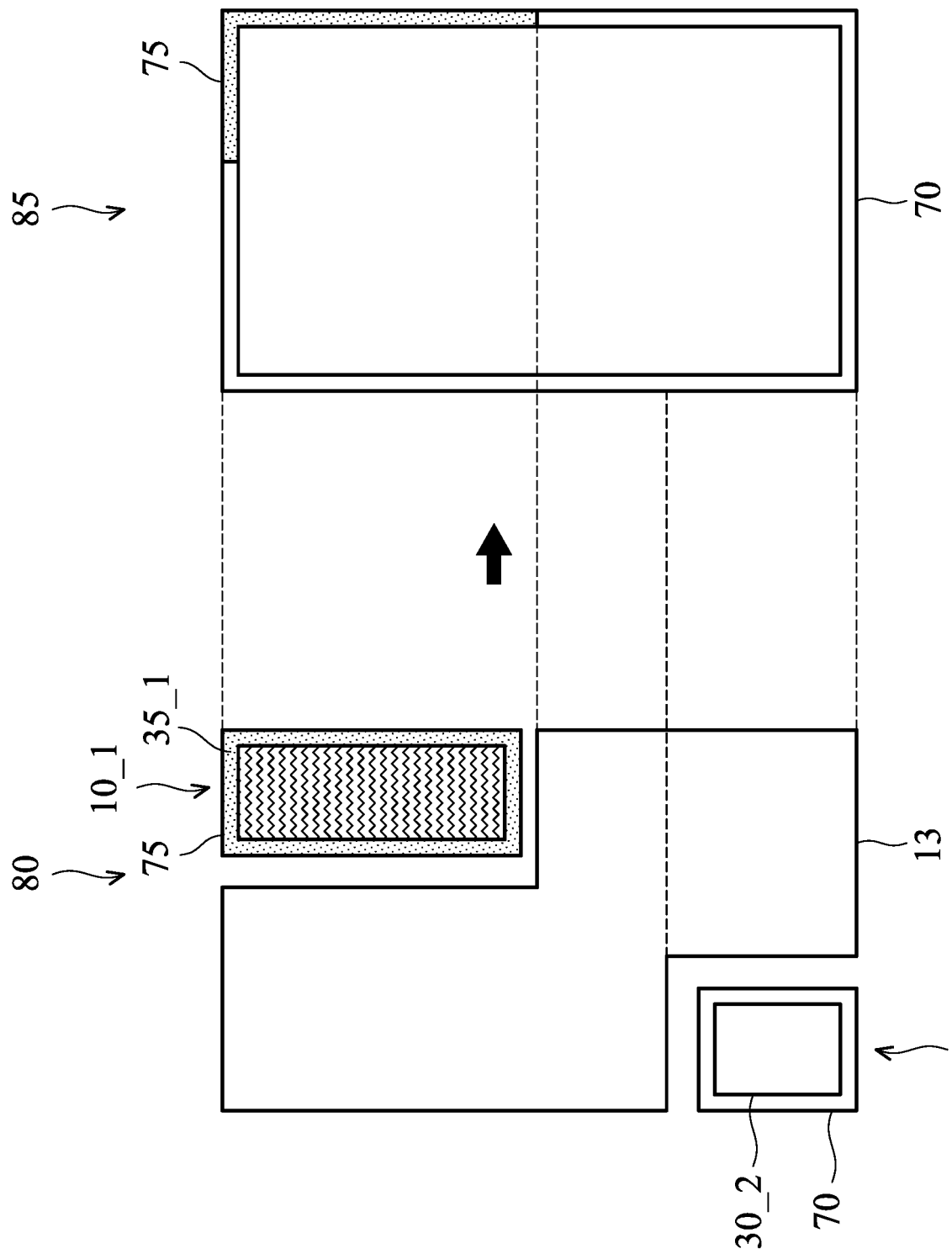
FIG. 8 illustrates an example for providing an APR block, in accordance with some embodiments of the disclosure.

FIG. 8 illustrates an example for providing an APR block, in accordance with some embodiments of the disclosure. First, the macros 10_1 and 10_2 and an APR region 13 are arranged in a floorplan 80, and the APR region 13 is placed between the macros 10_1 and 10_2. The macro 10_2 includes a main pattern 30_2 and a boundary marker 70, and the boundary marker 70 represents that the main pattern 30_2 of the macro 10_2 is surrounded by a plurality of dummy boundary cells 20 (not shown). The macro 10_1 includes a main pattern 35_1 and a boundary marker 75, and the boundary marker 75 represents that the main pattern 35_1 of the macro 10_1 is surrounded by a plurality of dummy boundary cells 25 (not shown). Furthermore, According to the floorplan 80, an APR block 85 is obtained, and the APR block 85 is a phantom LEF data represents all required information for an APR of the macros 10_1 and 10_2 and the APR region 13. Thus, a boundary mark of the APR block 85 is divided into a boundary marker 75 around the upper right corner of the APR block 85 and a boundary marker 70 around the other corners of the APR block 85. Thus, in the APR block 85, the main pattern 35_1 is still protected by the boundary marker 75.

Figure 9C:
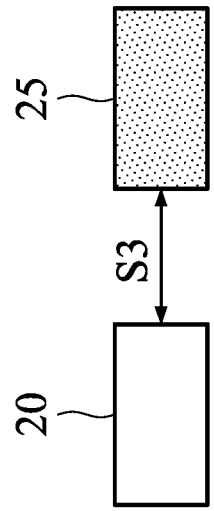
FIG. 9C illustrates the space S3 between the dummy boundary cells.
Figure 9B:
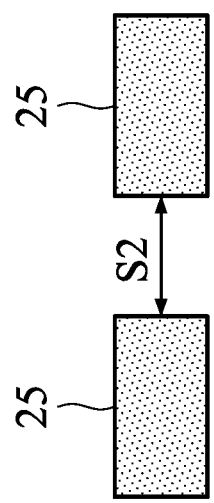
FIG. 9B illustrates the space S2 between two dummy boundary cells.
Figure 9A:
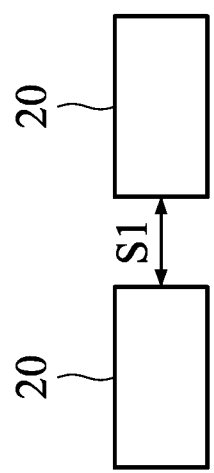
FIG. 9A illustrates the space S1 between two dummy boundary cells.

FIG. 9A illustrates the space S1 between two dummy boundary cells 20. In some embodiments, the two dummy boundary cells 20 are in contact with each other, and the space S1 is equal to zero. As described in operation S220 of FIG. 2, it is checked whether the space between the dummy boundary cells 20 of two macros is equal to the space S1. If the check fails, the placements of the two macros are adjusted, so as to modify the space between the dummy boundary cells 20 of two macros as the space S1.

FIG. 9B illustrates the space S2 between two dummy boundary cells 25. In some embodiments, the space S2 is greater than the space S1 of FIG. 9A, i.e., S2>S1. In some embodiments, the two dummy boundary cells 25 are in contact with each other, and the space S2 is equal to zero. As described in operation S220 of FIG. 2, it is checked whether the space between the dummy boundary cells 25 of two macros is equal to the space S2. If the check fails, the placements of the two macros are adjusted, so as to modify the space between the dummy boundary cells 25 of two macros as the space S2.

FIG. 9C illustrates the space S3 between the dummy boundary cell 20 and the dummy boundary cell 25, and the space S3 is greater than the space S2 of FIG. 9B, i.e., S3>S2. In some embodiments, the space S3 is greater than the space S2 of FIG. 9B, and the space S2 of FIG. 9B is greater than the space S1 of FIG. 9A, i.e., S3>S2>S1. In some embodiments, the spaces S1 and S2 are equal to zero, and the space S3 is greater than 0. In other words, a space is present between the two types of the dummy boundary cells. As described in operation S220 of FIG. 2, it is checked whether the space between the dummy boundary cells 25 of one macro and the dummy boundary cells 20 of one macro is equal to the space S3. If the check fails, the placements of the two macros are adjusted, so as to modify the space between the dummy boundary cells 20 and 25 of two macros as the space S3.

Figure 10A:
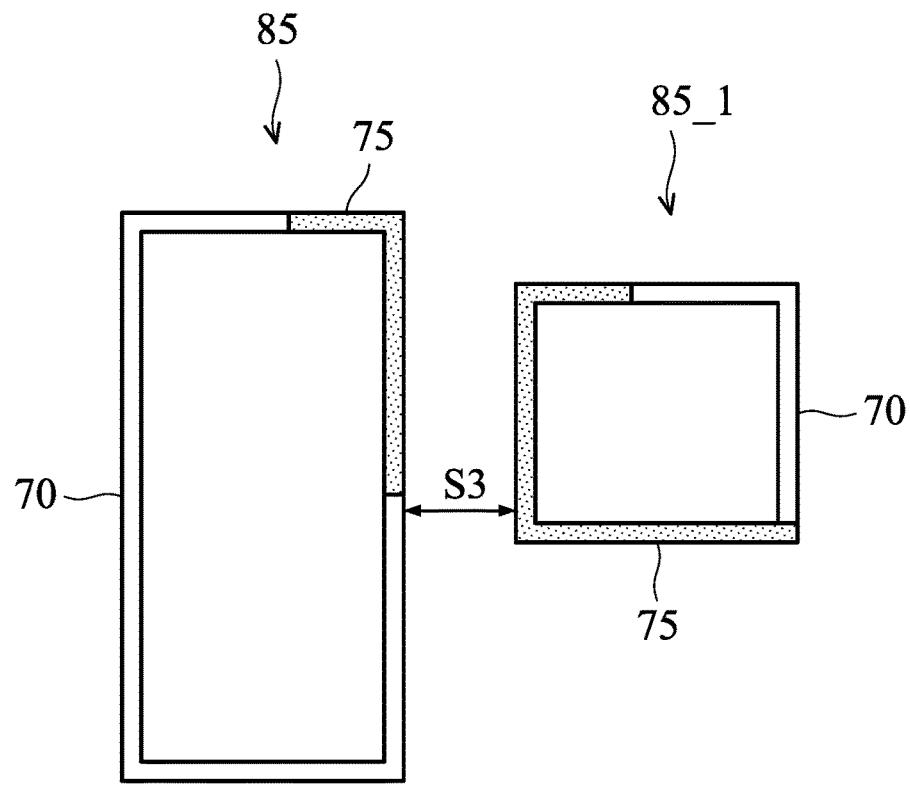
FIGS. 10A and 10B illustrate the placement of the APR block of FIG. 8 and an APR bock, in accordance with some embodiments of the disclosure.
Figure 10B:
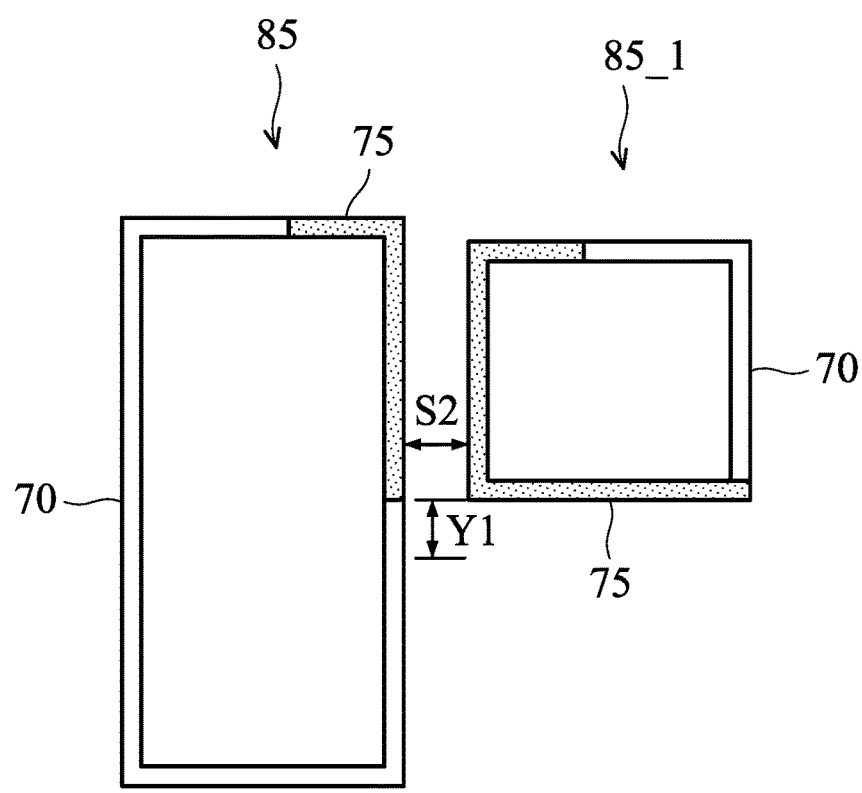

FIGS. 10A and 10B illustrate the placement of the APR block 85_1 of FIG. 8 and an APR bock 85_1, in accordance with some embodiments of the disclosure. As described above, the boundary marker 70 is formed by the dummy boundary cells 20, and the boundary marker 75 is formed by the dummy boundary cells 25. Furthermore, a boundary mark of the APR block 85 is divided into a boundary marker 75 around the upper right corner of the APR block 85 and a boundary marker 70 around the other corners of the APR block 85. Furthermore, a boundary mark of the APR block 85_1 is divided into a boundary marker 75 around the upper left corner, the left side and the lower side of the APR block 85_1, and a boundary marker 70 around the upper right corner and the right side of the APR block 85_1.

If the APR block 85_1 is arranged on the right of the APR block 85, the boundary marker 75 in the left side of the APR block 85_1 will be opposite the first boundary marker 70 and/or the boundary marker 75 in the right side of the APR block 85. If the boundary marker 75 in the left side of the APR block 85_1 is opposite the first boundary marker 70 and the boundary marker 75 in the right side of the APR block 85, the distance between the APR blocks 85 and 85_1 is equal to the space S3, as shown in FIG. 10A. If the boundary marker 75 in the left side of the APR block 85_1 is only opposite the boundary marker 75 in the right side of the APR block 85, the distance between the APR blocks 85 and 85_1 is equal to the space S2, as shown in FIG. 10B. For example, the APR block 85_1 of FIG. 10A moves up the distance Y1 to obtain the APR block 85_1 of FIG. 10B.

Figure 11B:
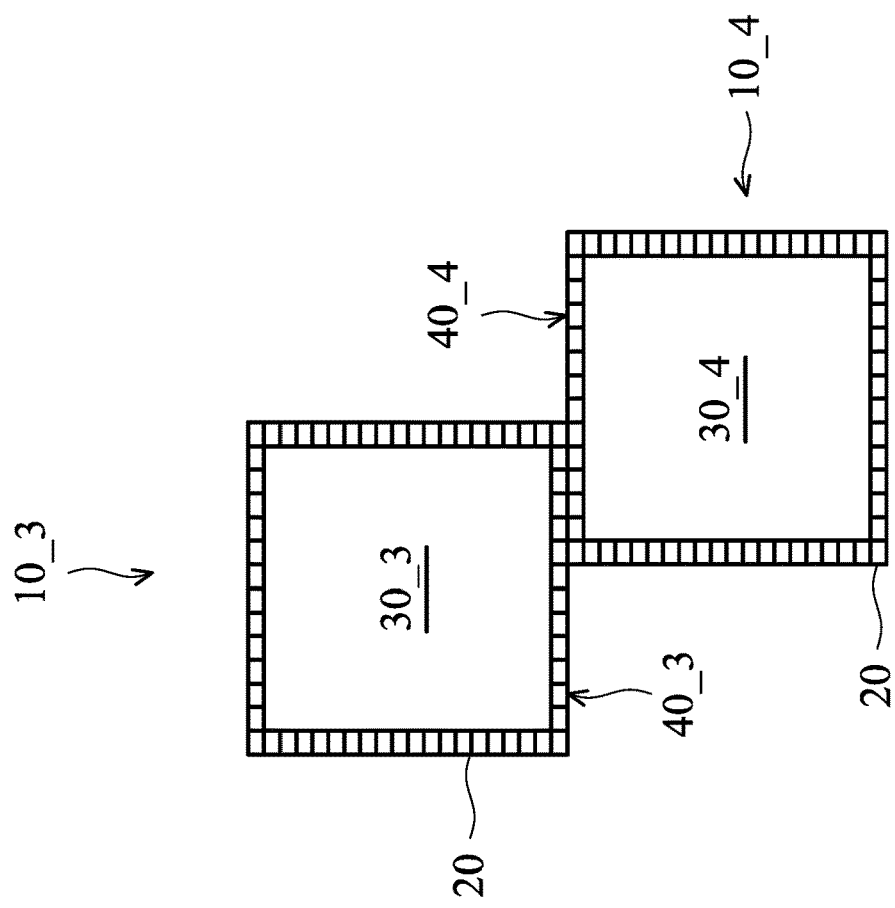
FIGS. 11A and 11B illustrate the placement of the macros, in accordance with some embodiments of the disclosure.
Figure 11A:
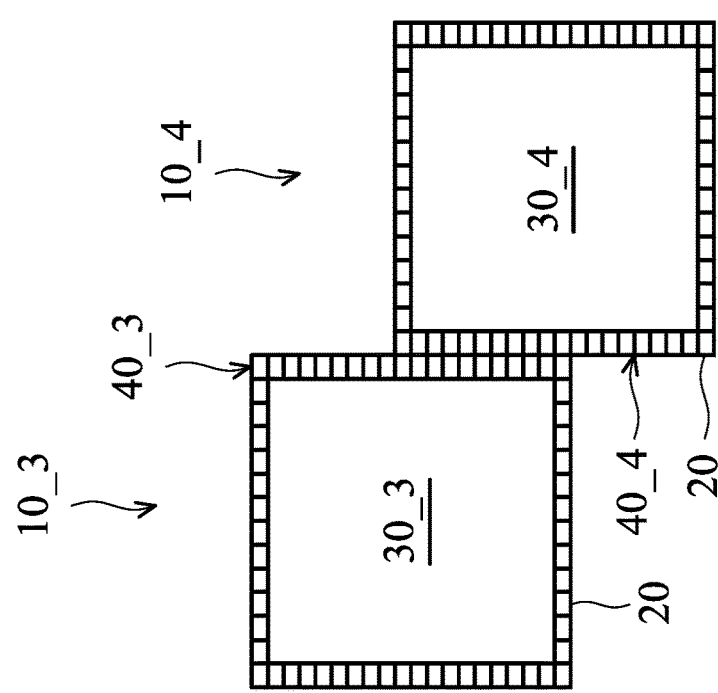

FIGS. 11A and 11B illustrate the placement of the macros 10_3 and 10_4, in accordance with some embodiments of the disclosure. The macro 10_3 includes a main pattern 30_3 and a macro boundary 40_3, and the macro boundary 40_3 is formed by the dummy boundary cells 20. The macro 10_4 includes a main pattern 30_4 and a macro boundary 40_4, and the macro boundary 40_4 is formed by the dummy boundary cells 20.

In FIG. 11A, the right side of the macro boundary 40_3 of the macro 10_3 is in contact with the left side of the macro boundary 40_4 of the macro 10_4 partially. Furthermore, the contacted dummy boundary cells 20 of the macro boundaries 40_3 and 40_4 are fully aligned.

In FIG. 11B, the lower side of the macro boundary 40_3 of the macro 10_3 is in contact with the upper side of the macro boundary 404 of the macro 10_4 partially. Furthermore, the contacted dummy boundary cells 20 of the macro boundaries 40_3 and 40_4 are fully aligned.

Figure 12B:
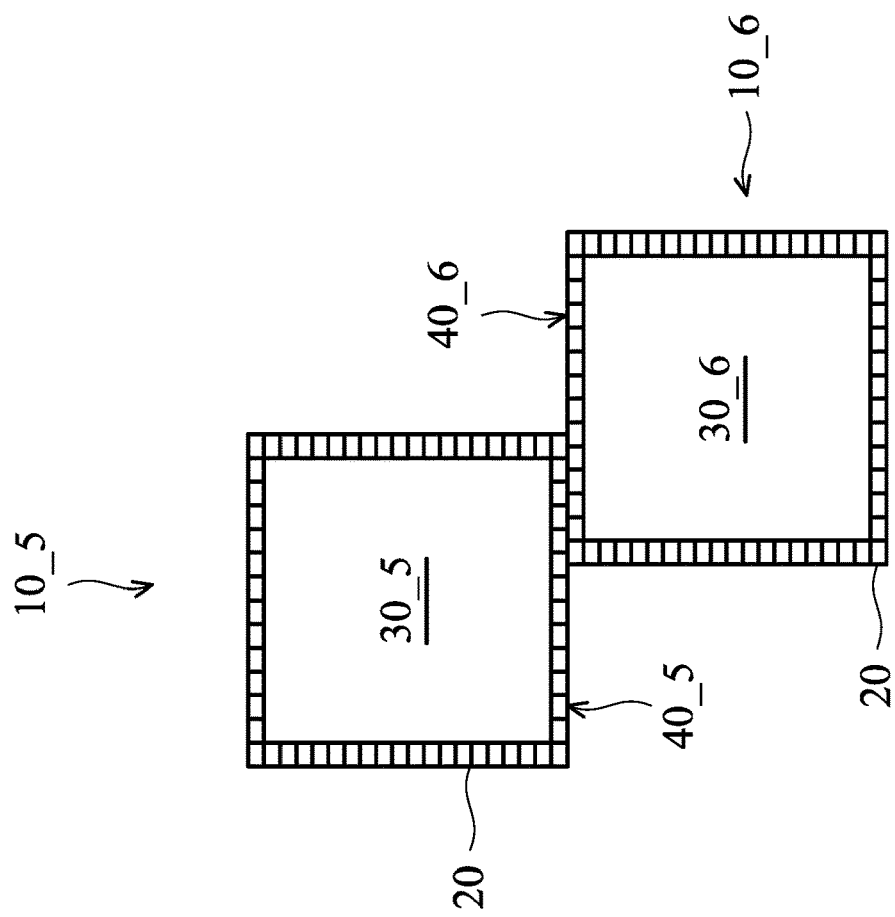
FIGS. 12A and 12B illustrate the placement of the macros, in accordance with some embodiments of the disclosure.
Figure 12A:
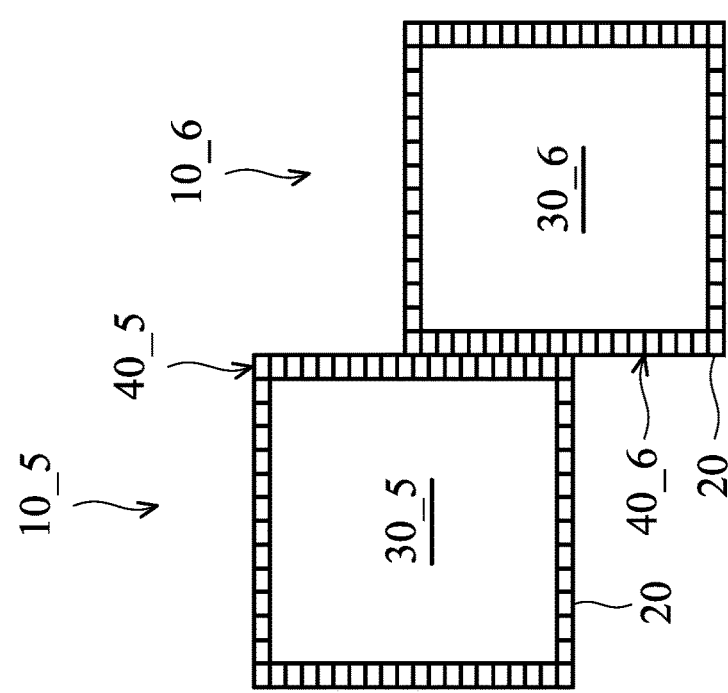

FIGS. 12A and 12B illustrate the placement of the macros 10_5 and 10_6, in accordance with some embodiments of the disclosure. The macro 10_5 includes a main pattern 30_5 and a macro boundary 40_5, and the macro boundary 40_5 is formed by the dummy boundary cells 20. The macro 10_6 includes a main pattern 30_6 and a macro boundary 40_6, and the macro boundary 40_6 is formed by the dummy boundary cells 20.

In FIG. 12A, the right side of the macro boundary 40_5 of the macro 10_5 is in contact with the left side of the macro boundary 40_6 of the macro 10_6 partially. Furthermore, the contacted dummy boundary cells 20 of the macro boundaries 40_5 and 40_6 are grid-base aligned. In other words, the upper and lower sides of the contacted dummy boundary cells 20 of the macro boundaries 40_5 and 40_6 are not aligned (e.g., are staggered).

In FIG. 12B, the lower side of the macro boundary 40_5 of the macro 10_5 is in contact with the upper side of the macro boundary 406 of the macro 10_6 partially. Furthermore, the contacted dummy boundary cells 20 of the macro boundaries 40_5 and 40_6 are grid-base aligned. In other words, the left and right sides of the contacted dummy boundary cells 20 of the macro boundaries 40_5 and 40_6 are not aligned (e.g., are staggered).

Figure 13:
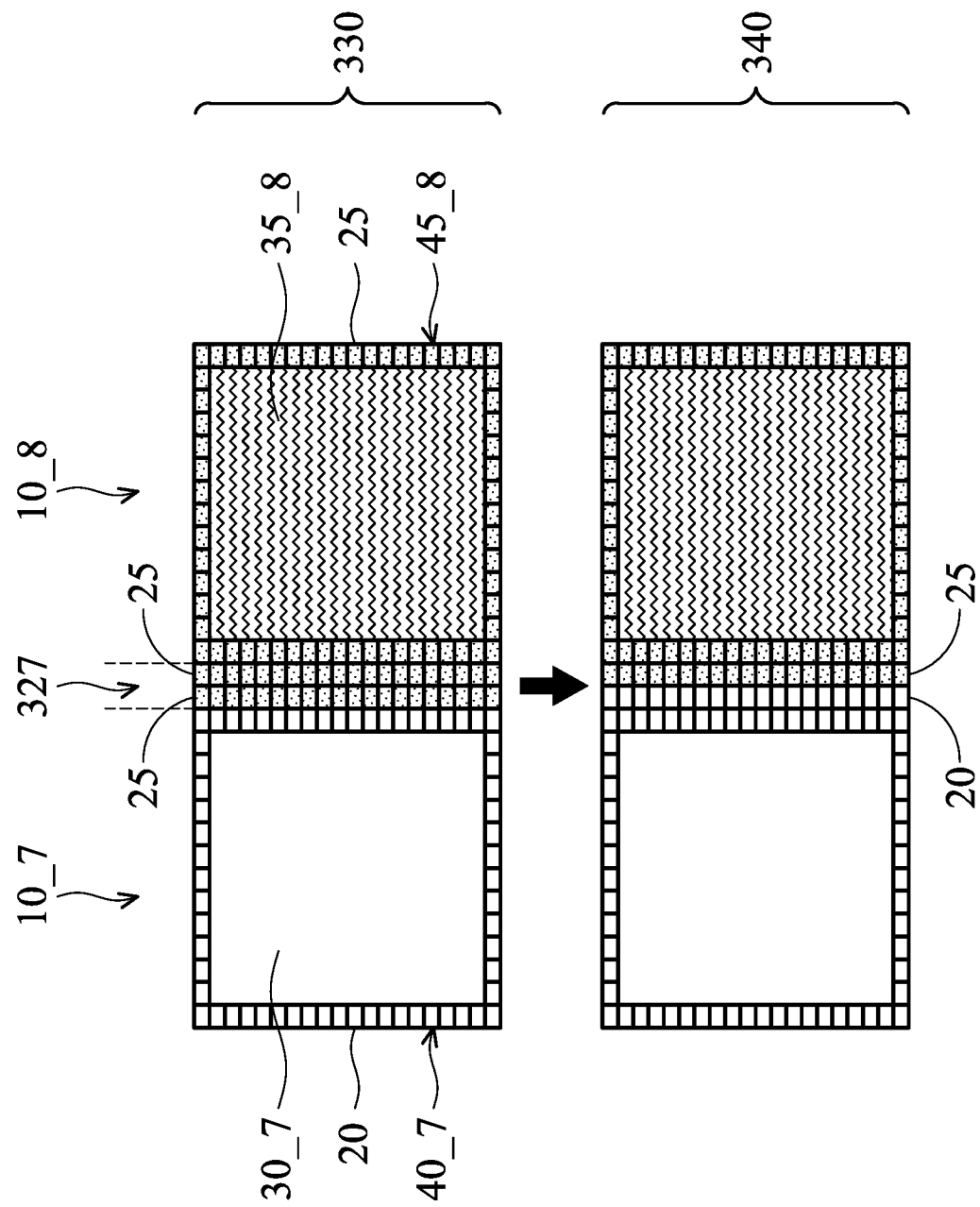
FIG. 13 illustrates the IP merge stage and the dummy treatment stage of the macros, in accordance with some embodiments of the disclosure.

FIG. 13 illustrates the IP merge stage 330 and the dummy treatment stage 340 of the macros 10_7 and 10_8, in accordance with some embodiments of the disclosure. In FIG. 13, the macro 10_7 is separated from the macro 10_8 by a sub-channel 327 of a channel (not shown). The macro 10_7 includes a main pattern 30_7 and a macro boundary 407 formed by the dummy boundary cells 20. As described above, the main pattern 30_7 includes the transistors with the first gate length Lg1, and the dummy boundary cells 20 are the first type of dummy boundary cells LgS with the first gate length Lg1. The macro 10_8 includes a main pattern 35_8 and a macro boundary 45_8 formed by the dummy boundary cells 25. As described above, the main pattern 35_8 includes the transistors with the second gate length Lg2, and the dummy boundary cells 25 are the second type of dummy boundary cells LgL with the second gate length Lg2. In the IP merge stage 330, the macros 10_7 and 10_8 and the sub-channel 327 are merged in GDS format. The sub-channel 327 is filled with boundary cells 25 (i.e., the default boundary cells). In the dummy treatment stage 340, the dummy boundary cells 25 within the sub-channel 327 and close to the dummy boundary cells 20 of macro 10_7 are replaced with the dummy boundary cells 20.

Figure 14:
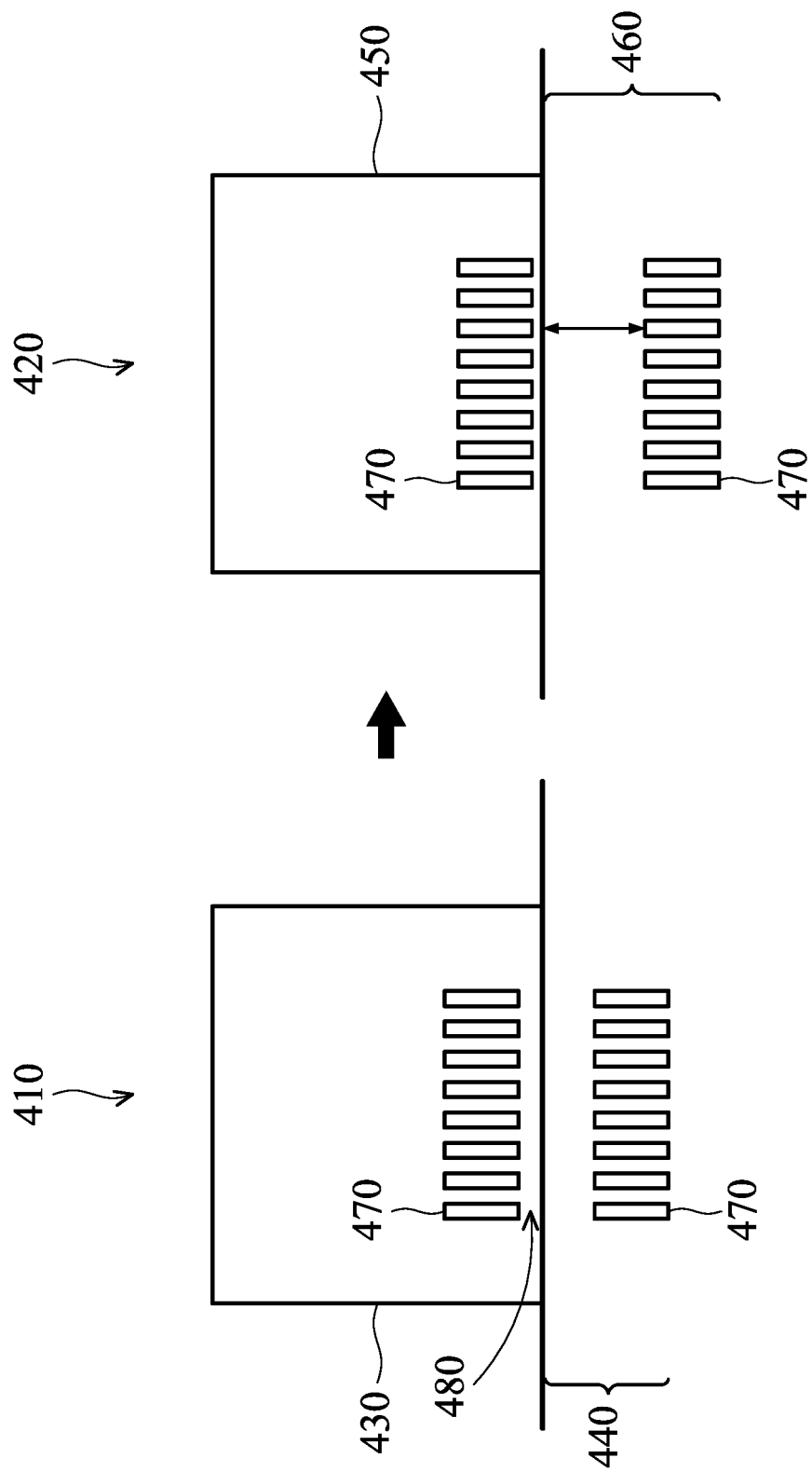
FIG. 14 illustrates a placement obtained by a traditional dummy cell insertion technique and a placement obtained by the method of FIG. 2.

FIG. 14 illustrates a placement 410 obtained by a traditional dummy cell insertion technique and a placement 420 obtained by the method of FIG. 2. In the placement 410, the macro 430 is a black box, that is a block box without GDS pattern. The dummy cells (e.g., the boundary cells) 470 of the macro 430 are moved up and the dummy cells 470 with the channel 440 are moved down during a top-level dummy insertion, so as to obtain a enough space for avoiding violation. In the placement 410, the dummy cell insertion behavior is dependent on environment, and not suitable for the macro 430. Furthermore, excess empty space is present for the dummy cells 470 in the macro 430, as indicated by the arrow 480. In other words, the dummy cells 470 will stay away from the edge of the macro 430, thereby decreasing IP protection for the macro 430. Because it is not easy to predict which neighbors will be next to the macro 430, positions of the dummy cells 470 within the macro 430 will be moved. Furthermore, if one of the macros is changed in top-level dummy insertion, the GDS of the macro is also changed, and the top-level dummy insertion is performed again to avoid violation.

In the placement 420, the macro 450 is a black box, that is a block box without GDS pattern. The dummy cells (e.g., the boundary cells) 470 of the macro 450 are placed in an earlier stage (or a hierarchy), e.g., in a first hierarchy. Furthermore, the dummy cells 470 of the macro 450 are close to the edge of the macro 450. The dummy cells 470 within the channel 460 are placed in the current stage, e.g., in a second hierarchy. In the current stage, the dummy cells 470 of the macro 450 will not be moved. Furthermore, the position of the dummy cells 470 within the channel 460 is determined according to the position of the dummy cells 470 of the macro 450, so as to avoid violation. Because the GDS of the macro 430 does not be changed, the run time of the top-level dummy insertion is decreased.

Figure 15:
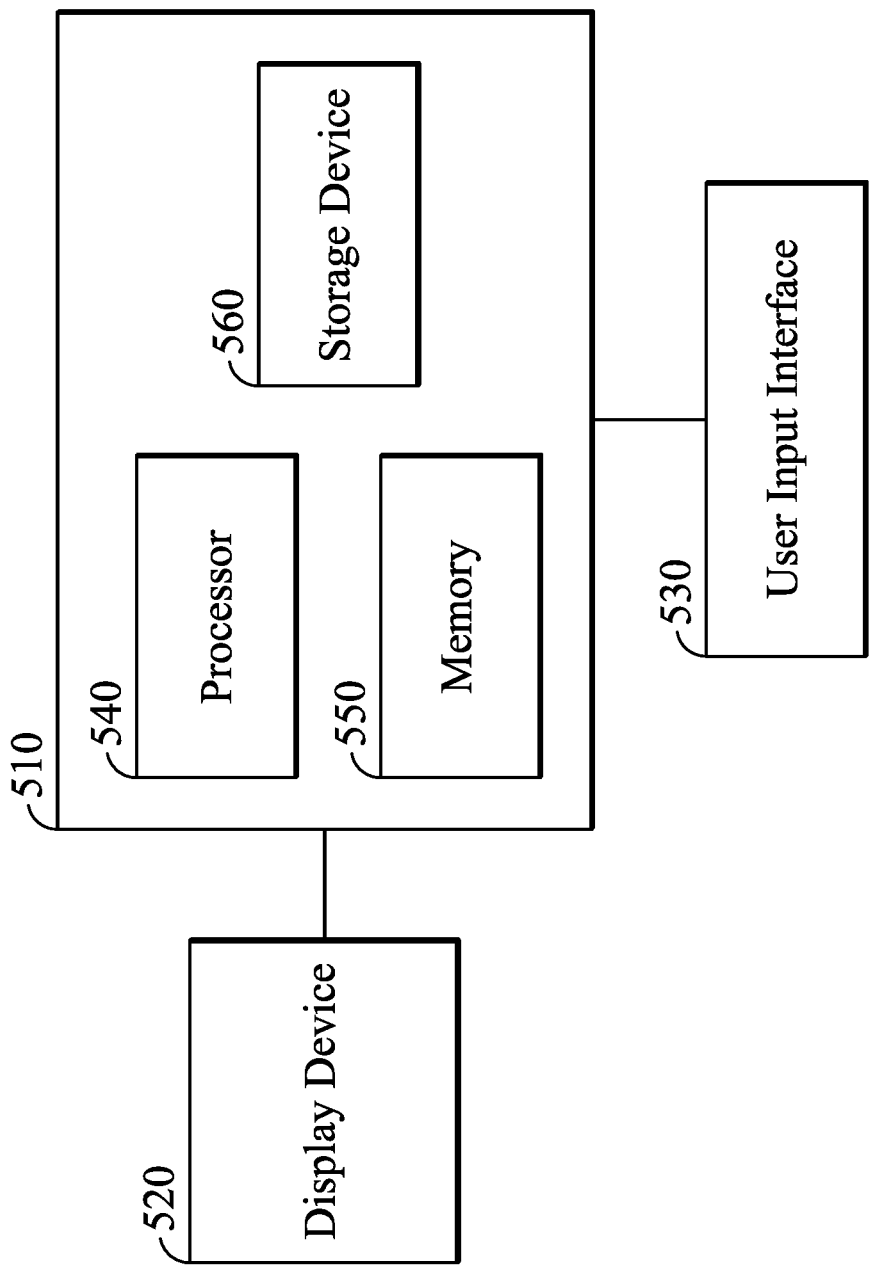
FIG. 15 shows a computer system, in accordance with some embodiments of the disclosure.

FIG. 15 shows a computer system 500, in accordance with some embodiments of the disclosure. The computer system 500 includes a computer 510, a display device 520 and a user input interface 530, wherein the computer 510 includes a processor 540, a memory 550, and a storage device 560. The computer 510 is coupled to the display device 520 and the user input interface 530, wherein the computer 510 is capable of operating an electronic design automation (EDA) tool. Furthermore, the computer 510 is capable of receiving the information regarding the layout of the IC and displaying the features of the layout on the display device 520. In some embodiments, the display device 520 is a GUI for the computer 510. Furthermore, the display device 520 and the user input interface 530 can be implemented in the computer 510. The user input interface 530 may be a keyboard, a mouse and so on. In the computer 510, the storage device 560 can store the operating systems (OSs), applications, and data that include input required by the applications and/or output generated by applications. The processor 540 of the computer 510 can perform one or more operations (either automatically or with user input), in any method that is implicitly or explicitly described in this disclosure. Furthermore, during operation, the processor 540 can load the applications of the storage device 560 into the memory 550, and then the applications can be used by a user to create, view, and/or edit the related placement for IC design.

In some embodiments, the apparatus or manufacture including a computer useable or readable medium having control logic (software) stored thereon is also referred to herein as a computer program product or program storage device. This includes, but is not limited to, the computer system 500 and the memory 550, as well as tangible articles of manufacture embodying any combination of the foregoing. Such control logic, when executed by one or more data processing devices (such as computer system 500), causes such data processing devices to operate as described herein.

In some embodiments, the operations of FIGS. 1 and 2, are realized as functions of a program stored in a non-transitory computer readable recording medium. Examples of a non-transitory computer readable recording medium include, but are not limited to, external/removable and/or internal/built-in storage or memory unit, e.g., one or more of an optical disk, such as a DVD, a magnetic disk, such as a hard disk, a semiconductor memory, such as a ROM, a RAM, a memory card, and the like.

The layout and the placement described in this disclosure can be partially or fully stored on a computer-readable storage medium and/or a hardware module and/or hardware apparatus. A computer-readable storage medium may be, but is not limited to, volatile memory, non-volatile memory, magnetic and optical storage devices such as disk drives, magnetic tape, CDs (compact discs), DVDs (digital versatile discs or digital video discs), or other media, now known or later developed, that are capable of storing code and/or data. Examples of hardware modules or apparatuses described in this disclosure include, but are not limited to, application-specific integrated circuits (ASICs), field-programmable gate arrays (FPGAs), dedicated or shared processors, and/or other hardware modules or apparatuses now known or later developed.

The methods and operations described in this disclosure can be partially or fully embodied as code and/or data stored in a computer-readable storage medium or device, so that when a computer system reads and executes the code and/or data, the computer system performs the associated methods and processes. The methods and operations can also be partially or fully embodied in hardware modules or apparatuses, so that when the hardware modules or apparatuses are activated, they perform the associated methods and processes. Note that the methods and operations can be embodied using a combination of code, data, and hardware modules or apparatuses.

Embodiments of methods for inserting a dummy boundary cell in a macro/IP and an integrated circuit (IC) are provided. An uniform IP/Macro boundary pattern is obtained by using different types of dummy boundary cells corresponding to different gate length to protect IP/macro. Each type of dummy boundary cells corresponds an individual gate length. The different types of dummy boundary cells have the same width and same length. Furthermore, the various types of dummy boundary cells can be swapped each other. Furthermore, a boundary marker is used to identify the type of the dummy boundary cells. Each macro is surrounded by the corresponding dummy boundary cells for protection. Since the different types of dummy boundary cells have the same sharp and size, it will be easy to abut the macros. Furthermore, the width/length of dummy boundary cells are defined by technology node. Moreover, in the channel, the dummy boundary cells are close to the macro boundary of each macro as possible. The macros with the macro boundaries and the channel are merged and some dummy boundary cells within the channel are replaced with other type of dummy boundary cells, so as to provide a top-level dummy prevention.

In some embodiments, an integrated circuit (IC) is provided. The IC includes a plurality of macros and a top channel. Each macro includes a macro boundary and a main pattern surrounded by the macro boundary. The top channel includes a plurality of first sub-channels and a plurality of second sub-channels. Each of the first sub-channels is arranged between a first macro and a second macro of the macros, and is formed by a plurality of first dummy boundary cells. Each of the second sub-channels is arranged between two of the second macros, and is formed by a plurality of second dummy boundary cells. The macro boundaries of the first macros are formed by the first dummy boundary cells, and the macro boundaries of the second macros are formed by the second dummy boundary cells. A first gate length of dummy patterns within the first dummy boundary cells is greater than a second gate length of dummy patterns within the second dummy boundary cells, and the first and second dummy boundary cells are the same size.

In some embodiments, an integrated circuit (IC) is provided. The IC includes a plurality of first macros, a plurality of second macros and a top channel arranged between the first and second macros. Each first macro includes a first macro boundary and a first main pattern surrounded by the first macro boundary. The first macro boundary includes a plurality of first dummy boundary cells and the first main pattern includes a plurality of transistors with a first gate length. Each second macro includes a second macro boundary and a second main pattern surrounded by the second macro boundary. The second macro boundary includes a plurality of second dummy boundary cells and the second main pattern includes a plurality of transistors with a second gate length, and the first gate length is different from the second gate length. The top channel includes the first dummy boundary cells. A plurality of dummy patterns of the first dummy boundary cells have the first gate length, and a plurality of dummy patterns of the second dummy boundary cells have the second gate length.

In some embodiments, an integrated circuit (IC) is provided. The IC includes at least one first macro, at least one second macro and a top channel between the first and second macros. The first macro includes a first macro boundary and a first main pattern surrounded by the first macro boundary. The first macro boundary is formed by a plurality of first dummy boundary cells. The second macro includes a second macro boundary and a second main pattern surrounded by the second macro boundary. The second macro boundary is formed by a plurality of second dummy boundary cells. The top channel is filled with the first dummy boundary cells. A first gate length of dummy patterns within the first dummy boundary cells is greater than a second gate length of dummy patterns within the second dummy boundary cells.

The foregoing outlines nodes of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An integrated circuit (IC), comprising:
   a plurality of macros, each comprising a macro boundary and a main pattern surrounded by the macro boundary; and
   a top channel comprising a plurality of first sub-channels and a plurality of second sub-channels,
   wherein each of the first sub-channels is arranged between a first macro and a second macro of the macros, and is formed by a plurality of first dummy boundary cells,
   wherein each of the second sub-channels is arranged between two of the second macros, and is formed by a plurality of second dummy boundary cells,
   wherein the macro boundaries of the first macros are formed by the first dummy boundary cells, and the macro boundaries of the second macros are formed by the second dummy boundary cells,
   wherein a first gate length of dummy patterns within the first dummy boundary cells is greater than a second gate length of dummy patterns within the second dummy boundary cells, and the first and second dummy boundary cells are the same size.

2. The IC as claimed in claim 1, wherein in each of the first and second macros, a gap between the main pattern and the macro boundary is filled with the second dummy boundary cells.

3. The IC as claimed in claim 1, wherein the main pattern of the first macro comprises a plurality of transistors with the first gate length, and the main pattern of the second macro comprises a plurality of transistors with the second gate length, wherein a distance between the main pattern and the macro boundary within the first macro is equal to a distance between the main pattern and the macro boundary within the second macro.

4. The IC as claimed in claim 1, wherein the top channel further comprises a plurality of third sub-channels between the first macro and a third macro of the macros and is formed by the first and second dummy boundary cells, wherein the macro boundary of the third macro is formed by the second dummy boundary cells, and the first dummy boundary cells within the third sub-channel are in contact with the macro boundary of first macro.

5. The IC as claimed in claim 1, wherein a fourth macro of the macros is in contact with a fifth macro of the macros, and the macro boundaries of the fourth and fifth macros are formed by the same first or second dummy boundary cells.

6. The IC as claimed in claim 5, wherein the main patterns of the fourth and fifth macros comprise a plurality of transistors with the same gate length.

7. The IC as claimed in claim 5, wherein a portion of the macro boundary of the fourth macro is in contact with a portion of the macro boundary of the fifth macro, and the first or second dummy boundary cells of the portions of the macro boundaries of the fourth and fifth macros are fully aligned or grid-base aligned.

8. An integrated circuit (IC), comprising:
- a plurality of first macros, each comprising a first macro boundary and a first main pattern surrounded by the first macro boundary, wherein the first macro boundary comprises a plurality of first dummy boundary cells and the first main pattern comprises a plurality of transistors with a first gate length;
- a plurality of second macros, each comprising a second macro boundary and a second main pattern surrounded by the second macro boundary, wherein the second macro boundary comprises a plurality of second dummy boundary cells and the second main pattern comprises a plurality of transistors with a second gate length, and the first gate length is different from the second gate length; and
- a top channel arranged between the first and second macros, and comprising the first dummy boundary cells,
wherein a plurality of dummy patterns of the first dummy boundary cells have the first gate length, and a plurality of dummy patterns of the second dummy boundary cells have the second gate length.

9. The IC as claimed in claim 8, wherein the top channel further comprising the second dummy boundary cells between one of the second macros and another second macro, wherein the first and second dummy boundary cells are the same size.

10. The IC as claimed in claim 8, wherein in each of the first macros, a gap between the first main pattern and the first macro boundary is filled with the first dummy boundary cells, and in each of the second macros, a gap between the second main pattern and the second macro boundary is filled with the second dummy boundary cells.

11. The IC as claimed in claim 8, wherein a distance between the first main pattern and the first macro boundary in the first macro is greater than a distance between the second main pattern and the second macro boundary in the second macro.

12. The IC as claimed in claim 8, wherein the top channel further comprising the second dummy boundary cells between one of the first macros and one of the second macros, and the second dummy boundary cells of the top channel are in contact with the second dummy boundary of the one of the second macros.

13. The IC as claimed in claim 8, wherein a portion of the first macro boundary of one of the first macros is in contact with a portion of the first macro boundary of another first macro, and the first dummy boundary cells of the portions of the first macro boundaries of the first macros are fully aligned or grid-base aligned.

14. The IC as claimed in claim 8, wherein a portion of the second macro boundary of one of the second macros is in contact with a portion of the second macro boundary of another second macro, and the second dummy boundary cells of the portions of the second macro boundaries of the second macros are fully aligned or grid-base aligned.

15. An integrated circuit (IC), comprising:
- at least one first macro comprising a first macro boundary and a first main pattern surrounded by the first macro boundary, wherein the first macro boundary is formed by a plurality of first dummy boundary cells;
- at least one second macro comprising a second macro boundary and a second main pattern surrounded by the second macro boundary, wherein the second macro boundary is formed by a plurality of second dummy boundary cells; and
- a top channel between the first and second macros, wherein the top channel is filled with the first dummy boundary cells,
wherein a first gate length of dummy patterns within the first dummy boundary cells is greater than a second gate length of dummy patterns within the second dummy boundary cells.

16. The IC as claimed in claim 15, wherein in the first macro, a gap between the first main pattern and the first dummy boundary is filled with the first dummy boundary cells, and in the second macro, a gap between the second main pattern and the second dummy boundary is filled with the second dummy boundary cells.

17. The IC as claimed in claim 15, wherein a distance between the first main pattern and the first macro boundary within the first macro is greater than a distance between the second main pattern and the second macro boundary within the second macro.

18. The IC as claimed in claim 15, wherein a portion of the first macro boundary of the first macro is in contact with a portion of the first macro boundary of another first macro, and the first dummy boundary cells of the portions of the first macro boundaries of the first macros are fully aligned or grid-base aligned.

19. The IC as claimed in claim 15, wherein a portion of the second macro boundary of the second macro is in contact with a portion of the second macro boundary of another second macro, and the second dummy boundary cells of the portions of the second macro boundaries of the second macros are fully aligned or grid-base aligned.

20. The IC as claimed in claim 15, wherein the first main pattern of the first macro comprises a plurality of transistors with the first gate length, and the second main pattern of the second macro comprises a plurality of transistors with the second gate length.

* * * * *